(12) United States Patent
Sunayama et al.

(10) Patent No.: US 7,765,387 B2
(45) Date of Patent: Jul. 27, 2010

(54) PROGRAM COUNTER CONTROL METHOD AND PROCESSOR THEREOF FOR CONTROLLING SIMULTANEOUS EXECUTION OF A PLURALITY OF INSTRUCTIONS INCLUDING BRANCH INSTRUCTIONS USING A BRANCH PREDICTION MECHANISM AND A DELAY INSTRUCTION FOR BRANCHING

(75) Inventors: Ryuichi Sunayama, Kawasaki (JP); Kuniki Morita, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 10/352,005

(22) Filed: Jan. 28, 2003

(65) Prior Publication Data

US 2004/0003207 A1 Jan. 1, 2004

(30) Foreign Application Priority Data

Jun. 28, 2002 (JP) .............................. 2002-190557

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................... 712/233; 712/218
(58) Field of Classification Search .................. 712/233
See application file for complete search history.

(56) References Cited

U.S. PATENT DOCUMENTS 5,265,213 A 11/1993 Weiser et al.
5,461,722 A 10/1995 Goto
5,515,519 A * 5/1996 Yoshioka et al. ............ 712/234
5,640,588 A * 6/1997 Vegesna et al. ............... 712/23
5,784,603 A * 7/1998 Leung et al. ................ 712/234
5,826,074 A * 10/1998 Blomgren ................... 712/234
5,867,683 A * 2/1999 Witt et al. ................... 712/218
6,240,510 B1 * 5/2001 Yeh et al. .................... 712/236
6,883,090 B2 * 4/2005 Kruckemyer ............... 712/233

FOREIGN PATENT DOCUMENTS

| JP | 3-122718 | 5/1991 |
|----|----------|--------|
| JP | 4-213727 | 8/1992 |
| JP | 5-40627 | 2/1993 |
| JP | 6-110683 | 4/1994 |
| JP | 7-93151 | 4/1995 |
| JP | 7-262008 | 10/1995 |

OTHER PUBLICATIONS

Computer Organization and Design.*
Japanese Office Action dated Jan. 24, 2006 of Japanese Application No. 2002-190556.
SPARC International Inc., "The SPARC Architecture Manual," Version 8, Revision SAV080SI9308, 1992 (pp. 3, 12, 32, 43, 50-53, 62, 63, and 134).
U.S. Appl. No. 10/345,296, filed Jan. 16, 2003, Ryuichi Sunayama, Fujitsu Limited Kawasaki, Japan.

* cited by examiner

*Primary Examiner*—Eddie P Chan
*Assistant Examiner*—Corey Faherty
(74) *Attorney, Agent, or Firm*—Staas & Halsey LLP

(57) ABSTRACT

A program counter control method controls instructions by an out-of-order method using a branch prediction mechanism and controls an architecture having delay instructions for branching. The method includes the steps of simultaneously committing a plurality of instructions including a branch instruction, when a branch prediction is successful and the branch instruction branches, and simultaneously updating a program counter and a next program counter depending on a number of committed instructions.

28 Claims, 20 Drawing Sheets

PROGRAM COUNTER CONTROL METHOD AND PROCESSOR THEREOF FOR CONTROLLING SIMULTANEOUS EXECUTION OF A PLURALITY OF INSTRUCTIONS INCLUDING BRANCH INSTRUCTIONS USING A BRANCH PREDICTION MECHANISM AND A DELAY INSTRUCTION FOR BRANCHING

This application claims the benefit of a Japanese Patent Application No. 2002-190557 filed Jun. 28, 2002, in the Japanese Patent Office, the disclosure of which is hereby incorporated by reference.

BACKGROUND OF THE INVENTION

1. Field of the Invention

The present invention generally relates to program counter control methods and processors, and more particularly to a program counter control method for simultaneously updating and controlling a program counter and a next program counter which are designed so that a plurality of instructions including branch instructions are completed simultaneously in an instruction control which makes a branch prediction and uses a delay instruction for branching, and to a processor which employs such a program counter control method.

2. Description of the Related Art

Recently, various instruction processing methods are employed in order to improve the performance of the processor. An out-of-order processing method is one of such instruction processing methods. In the processor which employs the out-of-order processing method, a completion of one instruction execution is not waited and subsequent instructions are successively inserted into a plurality of pipelines to execute the instructions, so as to improve the performance of the processor.

However, in a case where execution of a preceding instruction affects execution of a subsequent instruction, the subsequent instruction cannot be executed unless the execution of the preceding instruction is completed. If the processing of the preceding instruction which affects the execution of the subsequent instruction is slow, the subsequent instruction cannot be executed during the processing of the preceding instruction, and the subsequent instruction must wait for the completion of the execution of the preceding instruction. As a result, the pipeline is disturbed, and the performance of the processor deteriorates. Such a disturbance in the pipeline is particularly notable in the case of a branch instruction.

The branch instructions include conditional branch instructions. In the case of the conditional branch instruction, if an instruction exists which changes the branch condition (normally, a condition code) immediately prior to the conditional branch instruction, the branch does not become definite until this instruction is completed and the branch condition becomes definite. Accordingly, because the sequence subsequent to the branch instruction is unknown, the subsequent instructions cannot be executed, and the process stops to thereby deteriorate the processing capability. This phenomenon is not limited to the processor employing the out-of-order processing method, and a similar phenomenon occurs in the case of processors employing processing methods such as a lock step pipeline processing method. However, the performance deterioration is particularly notable in the case of the processor employing the out-of-order processing method. Hence, in order to suppress the performance deterioration caused by the branch instruction, a branch prediction mechanism is normally provided in an instruction control unit within the processor. The branch prediction mechanism predicts the branching, so as to execute the branch instruction at a high speed.

In the case of a processor employing the out-of-order processing method and provided with the branch prediction mechanism, a plurality of branch instructions are inserted into an executing pipeline based on a result of the branch prediction. When the branch instruction branches, a branching destination address needs to be set in an instruction address register. In a processor employing a SPARC architecture, this instruction address register is called a program counter and a next program counter. If a plurality of branch instructions exist in the executing pipeline, the instruction address register needs to hold the branching destination address of each branch instruction until the branch instruction is completed. However, a timing at which the branching becomes definite differs for each branch instruction. For this reason, conventionally, it was necessary to also hold the branching destination address of the branch instruction which actually does not branch.

A throughput of the executing pipeline is determined by a throughput of a branch instruction controller and a number of branching destination address register which holds the branching destination address. However, when the branching destination address register is used by the branching destination address of the branch instruction which actually does not branch, the throughput of the branch instruction is suppressed as a result. For this reason, it becomes necessary to further increase the number of branching destination address registers to improve the throughput of the branch instruction, but the increase in the number of branching destination address registers consequently suppresses the throughput of the branch instruction, thereby generating a vicious circle.

In an instruction control unit, a number of instructions that may be process in one cycle is one of factors determining an execution speed of the instruction control unit. In the instruction control unit employing the out-of-order processing method, it is possible to complete a plurality of instructions simultaneously. Normally, the completion of an instruction indicates a point in time when updating of resources that are used, such as registers, is completed. But when completing a plurality of instructions simultaneously, it is necessary to simultaneously complete the updating of the resources that are used. Hence, the instruction address register also needs to be updated by an amount corresponding to the plurality of instructions. When controlling an architecture which uses delay instructions for branching, typified by the SPARC architecture, the execution of the delay instruction is determined by whether or not the branch instruction branches, and it is necessary to update two registers, namely, the program counter and the next program counter. For this reason, it was conventionally only possible to complete the branch instruction (commit) only by itself or from a predetermined position (relative position with respect to another instruction which is completed simultaneously). Normally, in a decode cycle, the position where the branch instruction is completed (committed) is also determined in a case where the branch instruction in packet form is completed (committed) by placing the branch instruction at the last position of the packet. In this case, the decode cycle and an instruction complete (commit) cycle are restricted by the branch instruction.

Recently, it has become possible to use memories having extremely large memory capacities, due to improvements in the LSI production techniques and the like, and thus, it has become possible to use 64-bit structures for operating systems and applications. Hence, the 64-bit structure is also required of the instruction control unit. However, when the 64-bit structure is used, the scale of the required circuits such as registers becomes large. In addition, registers related to the control of the branch instruction also need to have the 64-bit structure, and the scale of the branching destination address register and the like also becomes large.

When the circuits are simply modified from the 32-bit structure to the 64-bit structure, the required circuits become doubled while the number of entries remains unchanged. As a result, there was a problem in that the circuit scale (assembling area) greatly increases when the 64-bit structure is used.

SUMMARY OF THE INVENTION

Accordingly, it is a general object of the present invention to provide a novel and useful program counter control method and processor, in which the problems described above are eliminated.

Another and more specific object of the present invention is to provide a program counter control method and a processor, which can improve a throughput of the branch instruction using a minimum circuit scale (assembling area). This is based on findings and observations made by the present inventors that, at the present, it is rare for a memory region of 4 Gbytes of greater to be used for the instruction region of the actual program, and it is rare for a case where a 4-Gbyte boundary is exceeded in the program to greatly affect the performance of the instruction processing.

Still another object of the present invention is to provide a program counter control method for controlling instructions by an out-of-order method using a branch prediction mechanism and controlling an architecture having delay instructions for branching, comprising simultaneously committing a plurality of instructions including a branch instruction, when a branch prediction is successful and the branch instruction branches; and simultaneously updating a program counter and a next program counter depending on a number of committed instructions. According to the program counter control method of the present invention, it is possible to improve a throughput of the branch instruction using a minimum circuit scale (assembling area).

A further object of the present invention is to provide a program counter control method for controlling instructions by an out-of-order method using a branch prediction mechanism and controlling an architecture having delay instructions for branching, comprising simultaneously committing a plurality of instructions including a branch instruction, when a branch prediction is successful and the branch instruction does not branch; and simultaneously updating a program counter and a next program counter depending on a number of committed instructions. According to the program counter control method of the present invention, it is possible to improve a throughput of the branch instruction using a minimum circuit scale (assembling area).

Another object of the present invention is to provide a program counter control method for controlling instructions by an out-of-order method using a branch prediction mechanism and controlling an architecture having delay instructions for branching, comprising simultaneously committing a plurality of instructions including a branch instruction, when a branch prediction fails and the branch instruction branches; and simultaneously updating a program counter and a next program counter depending on a number of committed instructions. According to the program counter control method of the present invention, it is possible to improve a throughput of the branch instruction using a minimum circuit scale (assembling area).

Still another object of the present invention is to provide a program counter control method for controlling instructions by an out-of-order method using a branch prediction mechanism and controlling an architecture having delay instructions for branching, comprising simultaneously committing a plurality of instructions including a branch instruction, when a branch prediction fails and the branch instruction does not branch; and simultaneously updating a program counter and a next program counter depending on a number of committed instructions. According to the program counter control method of the present invention, it is possible to improve a throughput of the branch instruction using a minimum circuit scale (assembling area).

A further object of the present invention is to provide a processor which controls instructions by an out-of-order method using a branch predictor and controls an architecture having delay instructions for branching, comprising a branch instruction controller simultaneously controlling a plurality of branch instructions by judging branch conditions of the branch instructions, determining whether or not a branch prediction is successful and controlling an instruction refetch; and a branching destination address register storing a plurality of branching destination addresses of branch instructions branching of which is definite, wherein the branching destination address register is controlled independently of the branch instruction controller and the branch predictor. According to the processor of the present invention, it is possible to improve a throughput of the branch instruction using a minimum circuit scale (assembling area).

Another object of the present invention is to provide a processor which controls instructions by an out-of-order method using a branch predictor and controls an architecture having delay instructions for branching, comprising a program counter section having a program counter and a next program counter; means for simultaneously committing a plurality of instructions including a branch instruction when a branch prediction is successful and the branch instruction branches; and means for simultaneously updating the program counter and the next program counter depending on a number of simultaneously committed instructions. According to the processor of the present invention, it is possible to improve a throughput of the branch instruction using a minimum circuit scale (assembling area).

Still another object of the present invention is to provide a processor which controls instructions by an out-of-order method using a branch predictor and controls an architecture having delay instructions for branching, comprising a program counter section having a program counter and a next program counter; means for simultaneously committing a plurality of instructions including a branch instruction when a branch prediction is successful and the branch instruction does not branch; and means for simultaneously updating the program counter and the next program counter depending on a number of simultaneously committed instructions. According to the processor of the present invention, it is possible to improve a throughput of the branch instruction using a minimum circuit scale (assembling area).

A further object of the present invention is to provide a processor which controls instructions by an out-of-order method using a branch predictor and controls an architecture having delay instructions for branching, comprising a program counter section having a program counter and a next program counter; means for simultaneously committing a plurality of instructions including a branch instruction when a branch prediction fails and the branch instruction branches; and means for simultaneously updating the program counter and the next program counter depending on a number of simultaneously committed instructions. According to the processor of the present invention, it is possible to improve a throughput of the branch instruction using a minimum circuit scale (assembling area).

Another object of the present invention is to provide a processor which controls instructions by an out-of-order method using a branch predictor and controls an architecture having delay instructions for branching, comprising a program counter section having a program counter and a next program counter; means for simultaneously committing a plurality of instructions including a branch instruction when a branch prediction fails and the branch instruction does not branch; and means for simultaneously updating the program counter and the next program counter depending on a number of simultaneously committed instructions. According to the processor of the present invention, it is possible to improve a throughput of the branch instruction using a minimum circuit scale (assembling area).

Other objects and further features of the present invention will be apparent from the following detailed description when read in conjunction with the accompanying drawings.

DESCRIPTION OF THE PREFERRED EMBODIMENTS

Figure 1:
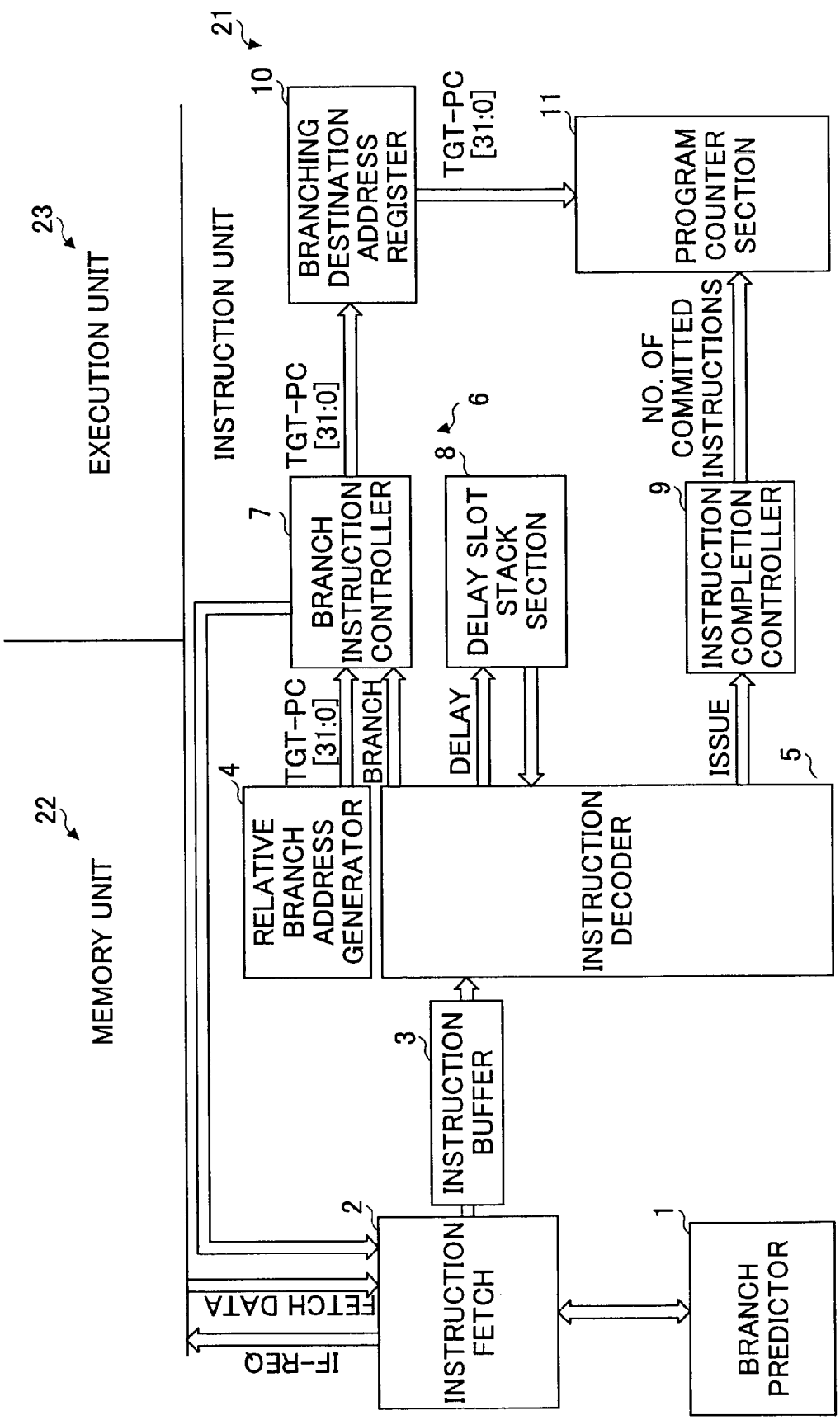
FIG. 1 is a system block diagram showing an embodiment of a processor according to the present invention.

A description will be given of various embodiments of a program counter control method according to the present invention and a processor according to the present invention, by referring to the drawings.

FIG. 1 is a system block diagram showing an embodiment of the processor according to the present invention. A processor 100 shown in FIG. 1 includes an instruction unit 21, a memory unit 22 and an execution unit 23. The instruction unit 21 forms an instruction control unit which employs an embodiment of a program counter control method according to the present invention. The memory unit 22 is provided for storing instructions, data and the like. The execution unit 23 is provided for executing various operations.

The instruction unit 21 includes a branch predictor 1, an instruction fetch part 2, an instruction buffer 3, a relative branch address generator 4, an instruction decoder 5, a branch instruction executing part 6, an instruction completion (commit) controller 9, a branching destination address register 10 and a program counter section 11 which are connected as shown in FIG. 1. The branch instruction executing part 6 includes a branch instruction controller 7 and a delay slot stack section 8. The program counter section 11 includes a program counter PC, a next program counter nPC and an updating part.

The branch instructions can be controlled independently in the branch predictor 1, the branch instruction controller 7, the instruction completion controller 9 and the branching destination address register 10. When the branch instruction existing in the executing pipeline is decoded by the instruction decoder 5, the branch instruction temporarily becomes under control of the branch instruction controller 7. The branch instruction controller 7 judges the branch condition of the branch instruction and whether the branch prediction became true or failed, and also controls the instruction refetch. The number of branch instructions controllable by the branch instruction controller 7 is determined by the number of entries. The branch instruction controller 7 carries out the control up to when the branch condition of the branch instruction becomes definite and when the branching destination address is generated, and the control is thereafter carried out by the instruction completion controller 9. The branching destination address register 10 controls the branching destination address of the branching branch instruction which is released from the control of the branch instruction controller 7. The branching destination address register 10 carries out the control up to the completion of the instruction, that is, the updating of the program counter section 11. The instruction completion controller 9 controls the instruction completion condition of all of the instructions, and the branch instruction is controlled thereby regardless of whether the branching is made.

A number MAX of branch instructions that may simultaneously exist in the executing pipeline is dependent on a number N of entries of the instruction completion controller 9. When the branching destination address register 10 (having a number M of entries) becomes full, the number MAX of branching instructions which branches becomes a sum L+M of the number M of entries of the branching destination address register 10 and a number L of entries of the branching instruction controller 7. The branching instructions which do not branch are not dependent on the number M of entries of the branching destination address register 10. The control under the branching destination address register 10 is only made until the branch instruction controller 7 releases and the instruction is completed (committed), and for this reason, the decoding of the instruction is unaffected while a vacancy exists in the branch instruction controller 7.

The branching destination address generation can be categorized into two kinds, namely, one for the instruction relative branching and another for the register relative branching. The branching destination address for the instruction relative branching is calculated in the relative branch address generator 4, and is supplied to the branching destination address register 10 via the branch instruction controller 7. The branching destination address for the register relative branching is calculated in the execution unit 23, and is supplied to the branching destination address register 10 via the branch instruction controller 7. For example, the lower 32 bits of the branching destination address for the register relative branching are supplied to the program counter section 11 via the branch instruction controller 7, and the upper 32 bits are supplied directly to the program counter section 11. The branching destination address of the register relative branching is calculated based on existence of a borrow bit and a carry bit when the upper 32 bits of the instruction address change, and thus, the branching destination instruction address is controlled by [(lower 32 bits)+(4-bit parity)+(borrow bit)+(carry bit)]×(number of entries) in the branch instruction controller 7. Similarly, the branching destination instruction address is controlled by [(lower 32 bits)+(4-bit parity)+(borrow bit)+(carry bit)]×(number of entries) in the branching destination address register 10. When the upper 32 bits of the instruction address change, the value is once set in the instruction buffer 3, before making an instruction fetch by a retry from the program counter section 11.

The control for updating the resources used is carried out by the instruction completion controller 9 and the program counter section 11. In the case of the program counter section 11, information indicating how may instructions were committed simultaneously and whether an instruction which branches was committed is supplied. In the case where the instruction which branches is committed, the information indicating this is also supplied to the branch instruction controller 7. In this embodiment, PC=nPC+{number of simultaneously committed instructions)−1}×4, nPC=nPC+{(number of simultaneously committed instructions)×4} or the branching destination address is supplied as the information. In this embodiment, the branching instruction which branches may be committed simultaneously with a preceding instruction, but may not be committed simultaneously with a subsequent instruction. This is because, a path of the branching destination address is not inserted in a path for setting the program counter PC. If the path of the branching destination address is inserted for the program counter PC, similarly to the case of the next program counter nPC, the restriction regarding the number of simultaneously committed branching instructions can be eliminated. With respect to the branch instruction which does not branch, there is no restriction in this embodiment regarding the number of simultaneously committed branching instructions. When the branch instruction is committed in this embodiment, there is no restriction regarding the committing position and there is no restriction at the time of the decoding.

Figure 2:
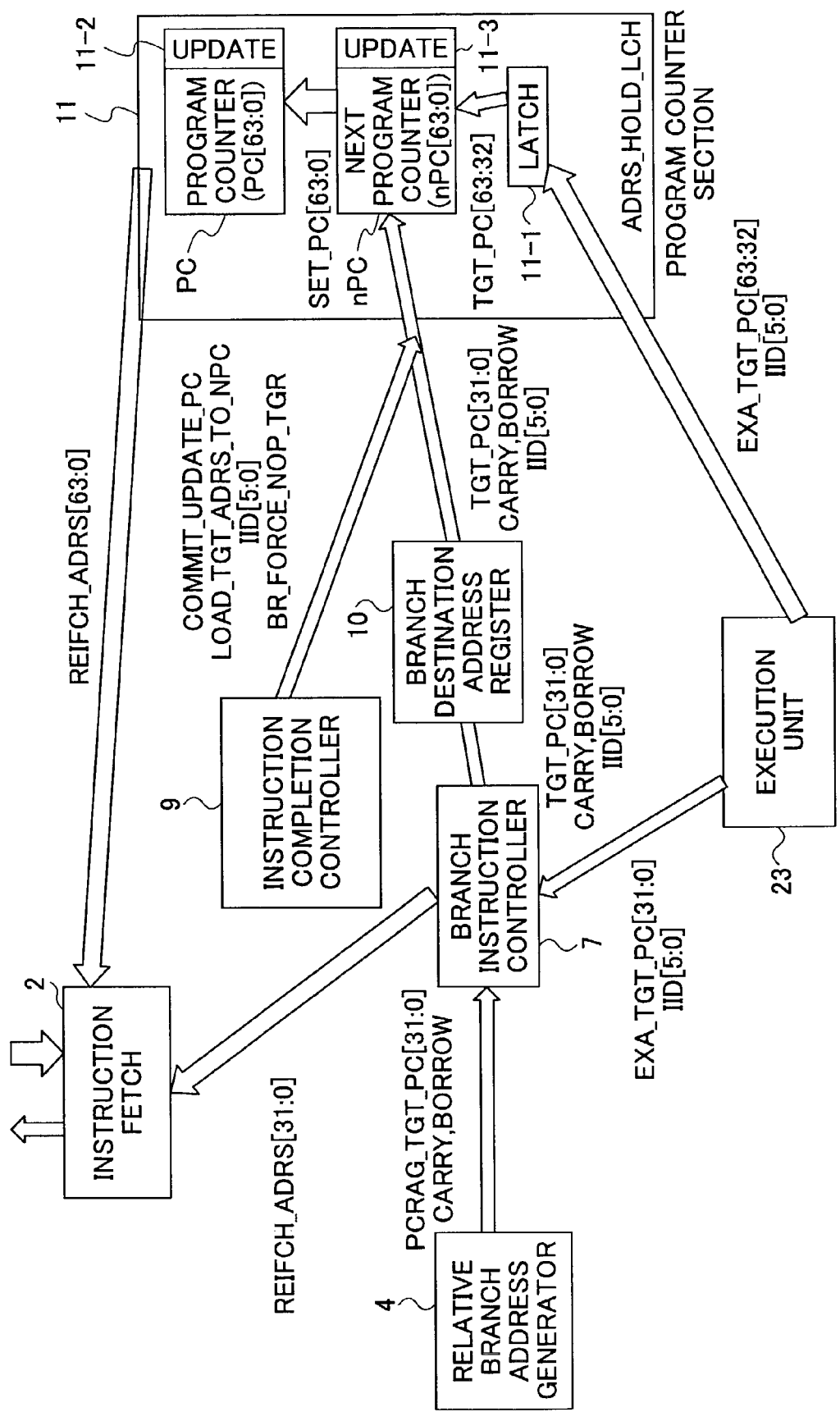
FIG. 2 is a system block diagram showing an important part of an instruction unit.

FIG. 2 is a system block diagram showing an important part of the instruction unit 21 shown in FIG. 1, together with the execution unit 23. In FIG. 2, those parts which are the same as those corresponding parts in FIG. 1 are designated by the same reference numerals, and a description thereof will be omitted. In FIG. 2, the illustration of the inputs to the branch instruction controller 7 and the instruction completion controller 9 from the instruction decoder 5 is omitted. The program counter section 11 includes the program counter PC, the next program counter nPC, a latch circuit 11-1, an updating circuit 11-2 for the program counter PC, and an updating circuit 11-3 for the next program counter nPC. In the following description, it is assumed for the sake of convenience that an address refers to a logical address, unless otherwise indicated.

In this embodiment, it is assumed for the sake of convenience that the processor employs a SPARC architecture. The instructions are processed by out-of-order processing, and a plurality of reservation stations for branch RSBR0 through RSBRm and a plurality of delay slot stacks DSS0 through DSSn are provided in the branch instruction executing part 6. In addition, the branch predictor 1 is provided as a branch instruction prediction mechanism.

Figure 3:
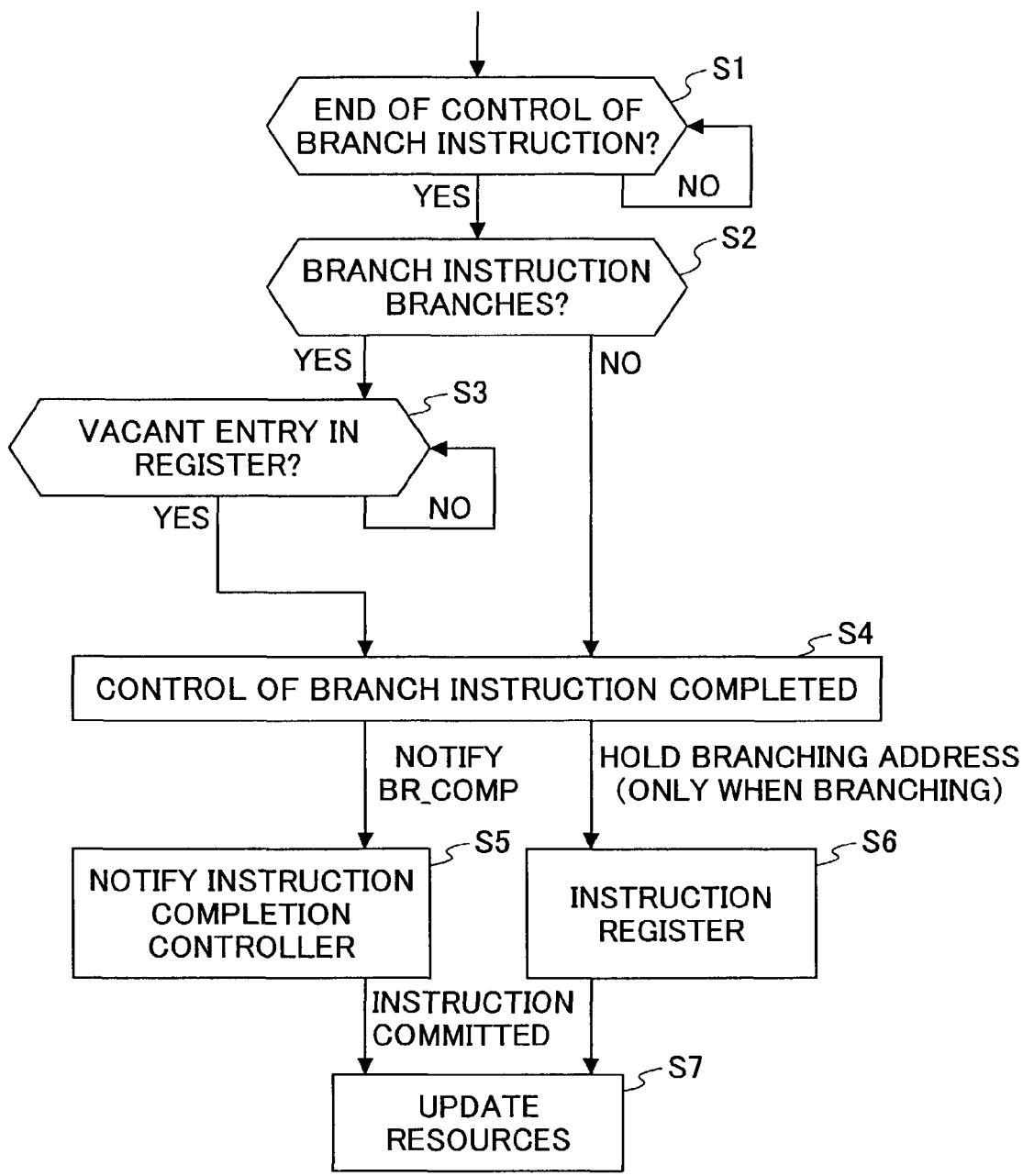
FIG. 3 is a flow chart for explaining an operation during a branch instruction control.

FIG. 3 is a flow chart for explaining an operation during the branch instruction control. In FIG. 3, a step S1 decides whether or not a branch instruction ended. If the decision result in the step S1 becomes YES, a step S2 decides whether or not the branch instruction branches. The process advances to a step S4 which will be described later, if the decision result in the step S2 is NO. On the other hand, if the decision result in the step S2 is YES, a step S3 decides whether or not a vacant entry exists in the branching destination address register 10. The process advances to the step S4 if the decision result in the step S3 becomes YES.

The step S4 completes control of the branch instruction in the branch instruction controller 7, and the process advances to steps S5 and S6. The step S5 notifies completion of the branch instruction to the instruction completion controller 9. Simultaneously as the step S5, the step S6 instructs the branching destination address register 10 to hold the branching address when branching. After the steps S5 and S6, a step S7 updates the resources, that is, updates the program counter section 11 by the updating circuits 11-2 and 11-3.

Figure 4:
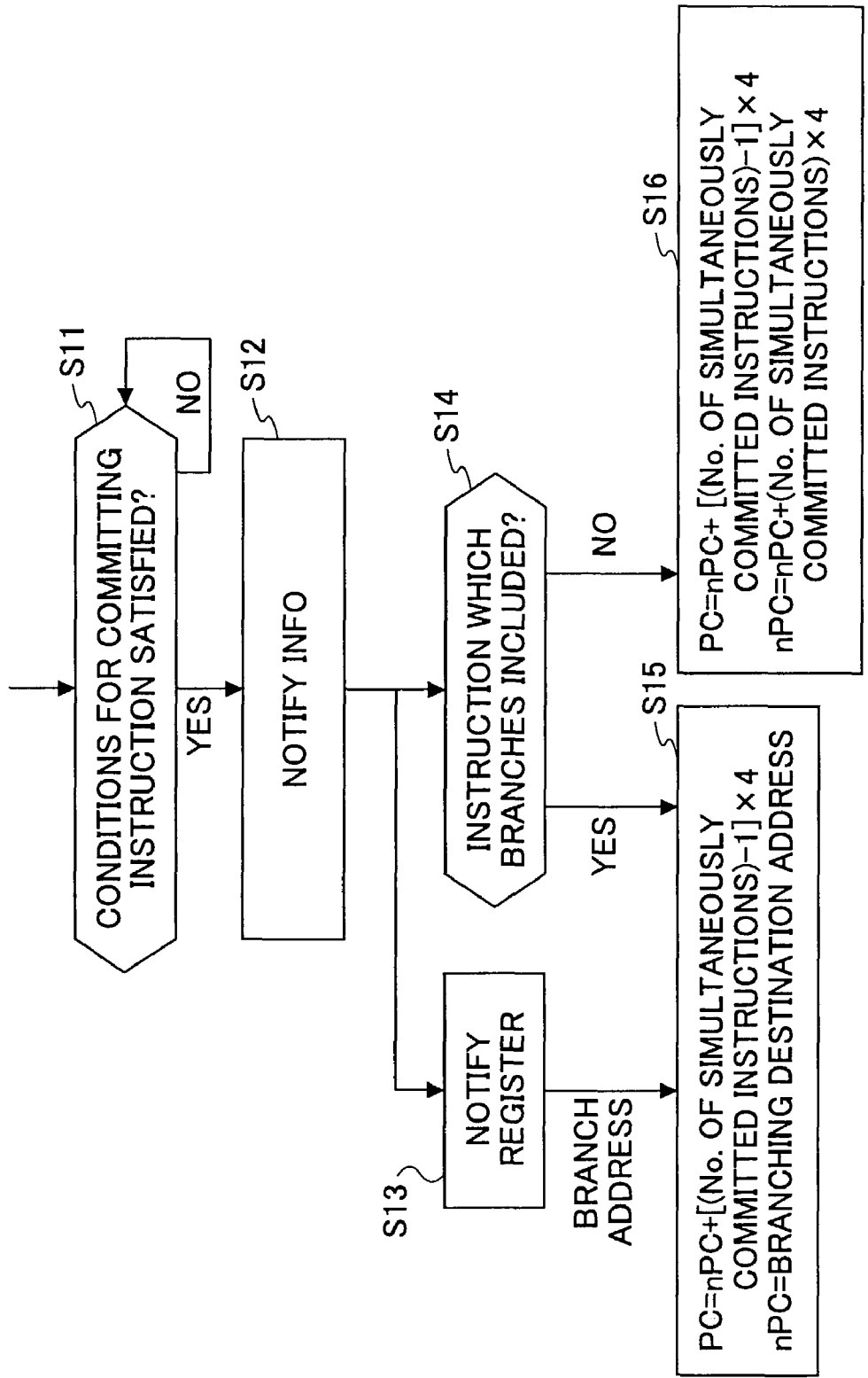
FIG. 4 is a flow chart for explaining an operation of a program counter section during an updating.

FIG. 4 is a flow chart for explaining an operation during updating of the program counter section 11. The process shown in FIG. 4 corresponds to the process of the step S7 shown in FIG. 3. In FIG. 4, a step S11 decides whether or not conditions for completing the instruction are satisfied. If the decision result in the step S11 becomes YES, a step S12 notifies, to the program counter section 11, information indicating a number of instructions which were committed simultaneously and whether or not a branch instruction which branches was committed. After the step S12, steps S13 and S14 are carried out simultaneously.

When the branch instruction which branches is committed, the step S13 notifies this information to the branching destination address register 10, and the process advances to a step S15 which will be described later. On the other hand, the step S14 decides whether or not a branch instruction which branches is included in the notified information. The process advances to the step S15 if the decision result in the step S14 is YES, and the process advances to a step S16 if the decision result in the step S14 is NO. The step S15 sets the program counter PC and the next program counter nPC to PC=nPC+[(number of simultaneously committed instructions)−1]×4 and nPC=(branching destination address). In addition, the step S16 sets the program counter PC and the next program counter nPC to PC=nPC+[(number of simultaneously committed instructions)−1]×4 and nPC=nPC+[(number of simultaneously committed instructions)×4].

Returning now to the description of FIG. 2, when an instruction fetch request is issued from the instruction fetch part 2, the branch predictor 1 makes a branch prediction with respect to an instruction address requested by the instruction fetch request. In a case where an entry corresponding to the instruction address requested by the instruction fetch request exists in the branch predictor 1, a flag BRHIS_HIT which indicates that the branch prediction is made is added to a corresponding instruction fetch data, and the instruction fetch request of the branching instruction address predicted by the branch prediction is output to the instruction fetch part 2. The instruction fetch data is supplied from the instruction fetch part 2 to the instruction decoder 5 together with the added flag BRHIS_HIT. The instruction is decoded in the instruction decoder 5, and in a case where the instruction is a branch instruction such as BPr, Bicc, BPcc, FBcc and FBPcc having the annul bit, a reference is made to the annul bit together with the flag BRHIS_HIT.

If the flag BRHIS_HIT=1, the instruction decoder 5 executes one subsequent instruction unconditionally. But if the flag BRHIS_HIT=0 and the annul bit is "1", the instruction decoder 5 carries out the decoding by making one subsequent instruction a non-operation (NOP) instruction. In other words, the instruction decoder 5 carries out the normal decoding if the flag BRHIS_HIT=1, but if the decoded result is a branch instruction, the flag BRHIS_HIT=0 and the annul bit is "1", the instruction decoder 5 changes the one subsequent instruction to the NOP instruction. In the SPARC architecture, a branch instruction having the annul bit executes a delay slot instruction (delay instruction) in the case where the branch occurs, and does not execute the delay slot instruction in the case where the branch does not occur and the annul bit is "1" and executes the delay slot instruction only in the case where the annul bit is "0". Making the branch prediction means that the instruction is a branch instruction and that the branching is predicted, and thus, executing a delay slot instruction is substantially the same as predicting. Instructions such as CALL, JMPL and RETURN which do not have an annul bit are unconditional branches, and always execute a delay slot instruction, thereby making it possible to treat these instructions similarly to the above. An instruction ALWAYS_BRANCH which is COND=1000 does not execute a delay slot instruction when the annul bit is "1" even though this instruction is an unconditional branch, but such a case does not occur frequently, and can thus be recovered by an instruction refetch.

When the branch prediction is made, it is unnecessary to make the instruction refetch if the branch prediction is true, and the instruction sequence at the predicted branching destination is the same as the actual instruction sequence. In addition, if the branch prediction is true, it means that the delay slot instruction is also executed correctly, and for this reason, the execution of the instructions is continued in this state.

On the other hand, if the branch prediction is made and the branch prediction does not become true, an instruction refetch is required. In this case, an erroneous instruction sequence is executed at the branching destination, and it is necessary to reexecute the actual instruction sequence. In addition, the execution of the delay slot instruction is also in error in this case, and the reexecution of the instructions is required from the delay slot instruction. In this embodiment, after the instruction refetch request of the branching destination is output from the branch instruction controller 8 to the instruction fetch part 2, the delay slot instruction to be reexecuted is obtained from the delay slot stack section 8, and the delay slot instruction is supplied to the instruction decoder 5. Hence, the recovery of the branch prediction, including the delay slot instruction, is made.

All branch instructions create entries in the branch instruction controller 7 and the instruction completion controller 9 when decoded by the instruction decoder 5. In the branch instruction controller 7, the branch instruction is controlled until the branching destination address and the branch condition of the branch instruction become definite. In the instruction completion controller 9, a control is carried out to commit the instruction, that is, a control is carried out to commit the instruction in order.

As described above, two kinds of branches, namely, the instruction relative branch and the register relative branch, are defined in the SPARC architecture. The branching destination address of the instruction relative branch is generated in the relative branch address generator 4, and the branching destination address of the register relative branch is generated in the execution unit 23. The branching destination address generated by the relative branch address generator 4 is supplied to the branch instruction controller 7. The branch instruction controller 7 receives a branching destination address PCRAG_TGT_PC[31:0,P3:P0], a carry bit (PCRAG_TGT-PC_CARRY and a borrow bit PCRAG_TGTPC_BORROW from the relative branching address generator 4, and a branching destination address EXA_TGT_PC[31:0,P3:P0] from the execution unit 23. In this state, the execution unit 23 supplies EXA_TGT_PC[63:32,P7:P4] to the program counter section 11.

When the control of the branch instruction in the branch instruction controller 7 is completed, the branch instruction is controlled by the instruction completion controller 9 until the instruction is committed. When the branch instruction is released from the branch instruction controller 7, the branching destination address is stored in the branching destination register 10 if the branch instruction branches. The branching destination address stored in the branching destination address register 10 is used to update the next program counter nPC of the program counter section 11 during a cycle W of the corresponding branch instruction. This cycle W is an updating cycle for the registers and the like, and the program counter PC and the next program counter nPC are updated during this cycle W. When releasing the branch instruction from the branch instruction controller 7, a confirmation is made to determine whether or not an entry of the branching destination address register 10 is vacant if the released branch instruction branches, and the branch instruction is released from the branch instruction controller 7 if a vacant entry exists, but the branch instruction is not released from the branch instruction controller 7 if no vacant entry exists. However, even if the branching destination address register 10 is full, the branch instruction is released from the branch instruction controller 7 if the branch instruction does not branch.

In this embodiment, the branch instruction controller 7 has 10 entries, and the branching destination address register 10 has 2 entries. Even if the branching destination address register 10 is full, the control of the subsequent branch instructions within the branch instruction controller 7 does not stop until the branch instruction controller 7 becomes full. The entries of the branch address register 10 are formed by VALID, the branching address TGT_PC[31:0,P3:P0], the carry bit TGT_PC_CARRY, the borrow bit TGT_PC_BORROW, and IID[5:0]. When VALID indicating the validity of the entry is VALID=1, it is indicated that the entry is valid. When the branch instruction which branches is released from the branch instruction controller 7, the entry is created in the branching destination address register 10, VALID is set to VALID=1, and the entry is held until the cycle W of this branch instruction.

Figure 5:
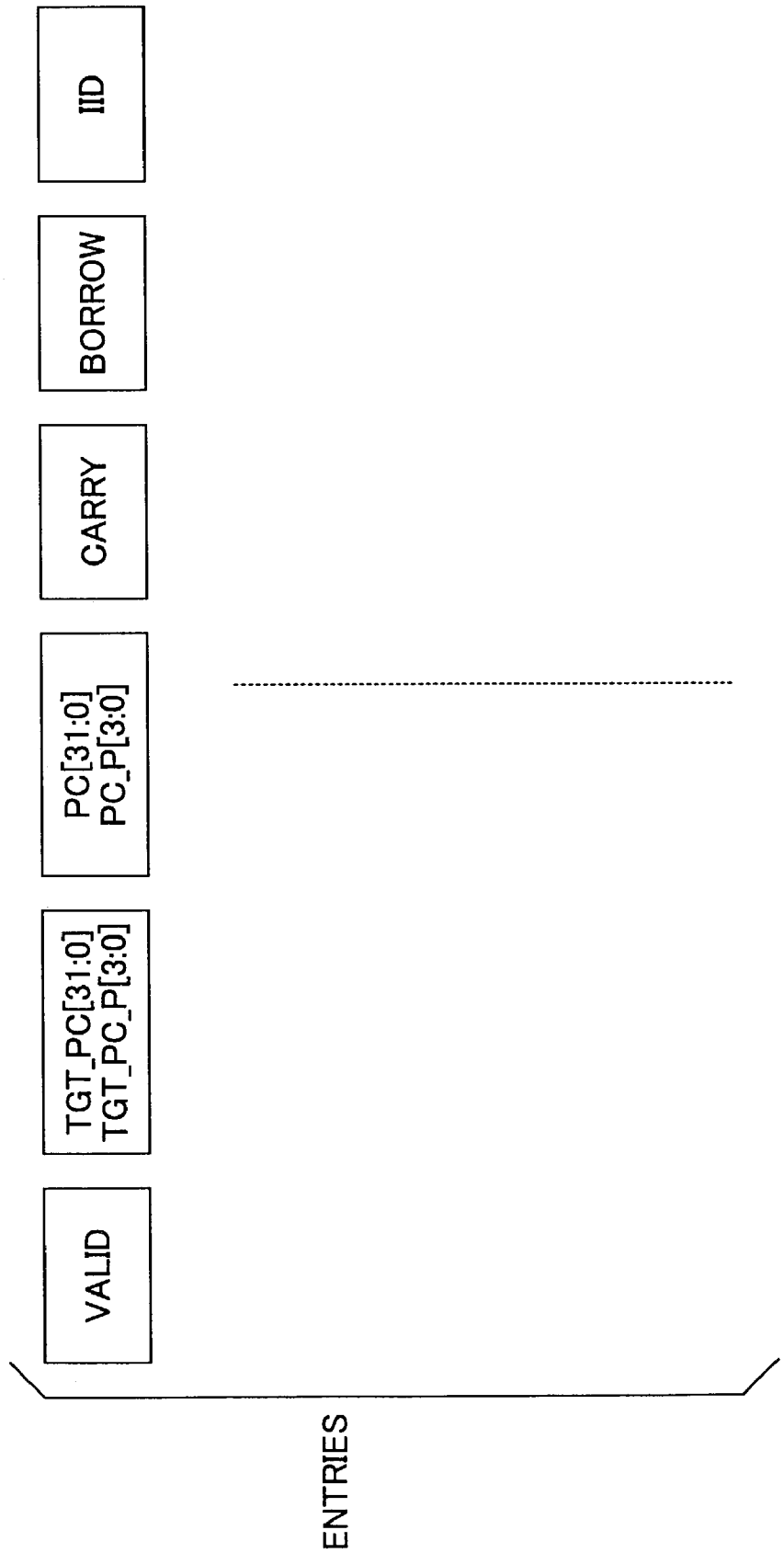
FIG. 5 is a diagram generally showing entries within a branch instruction controller.

FIG. 5 is a diagram generally showing the entries within the branch instruction controller 7. The 10 entries shown in FIG.

5 include VALID, the branching address TGT_PC[31:0,P3:P0], the carry bit CARRY, the borrow bit BORROW, and the instruction ID IID.

Figure 6:
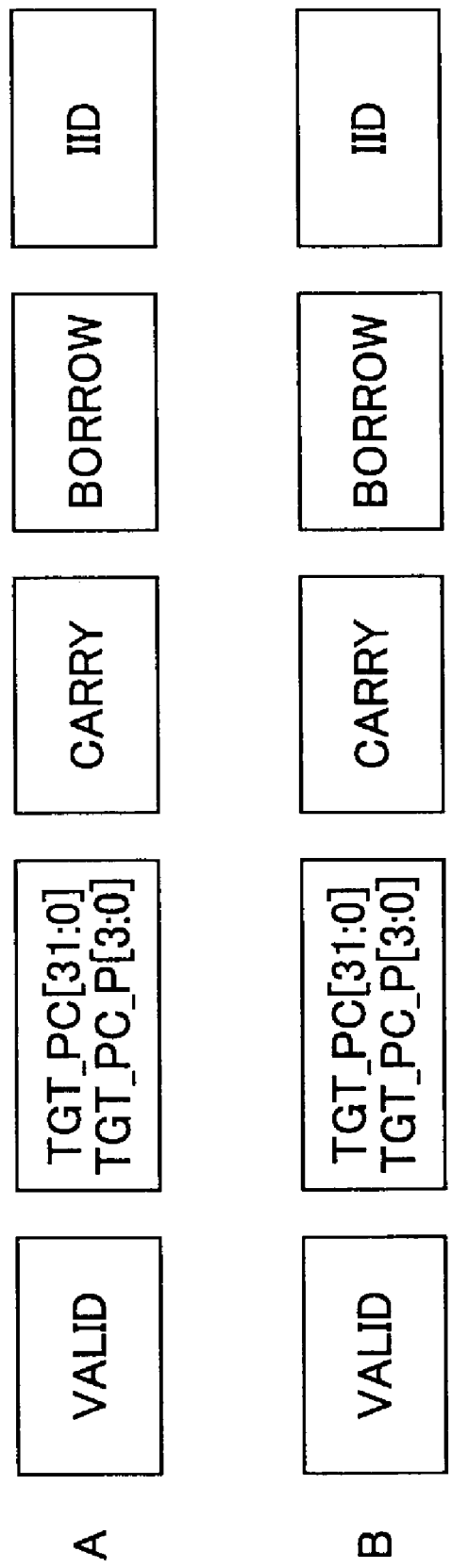
FIG. 6 is a diagram generally showing entries within a branching destination address register.

FIG. 6 is a diagram generally showing the entries within the branching destination address register 10. The 2 entries A and B shown in FIG. 6 respectively include VALID, the branching address TGT_PC[31:0, P3:P0], the carry bit CARRY, the borrow bit BORROW, and the instruction ID IID.

Figure 7:
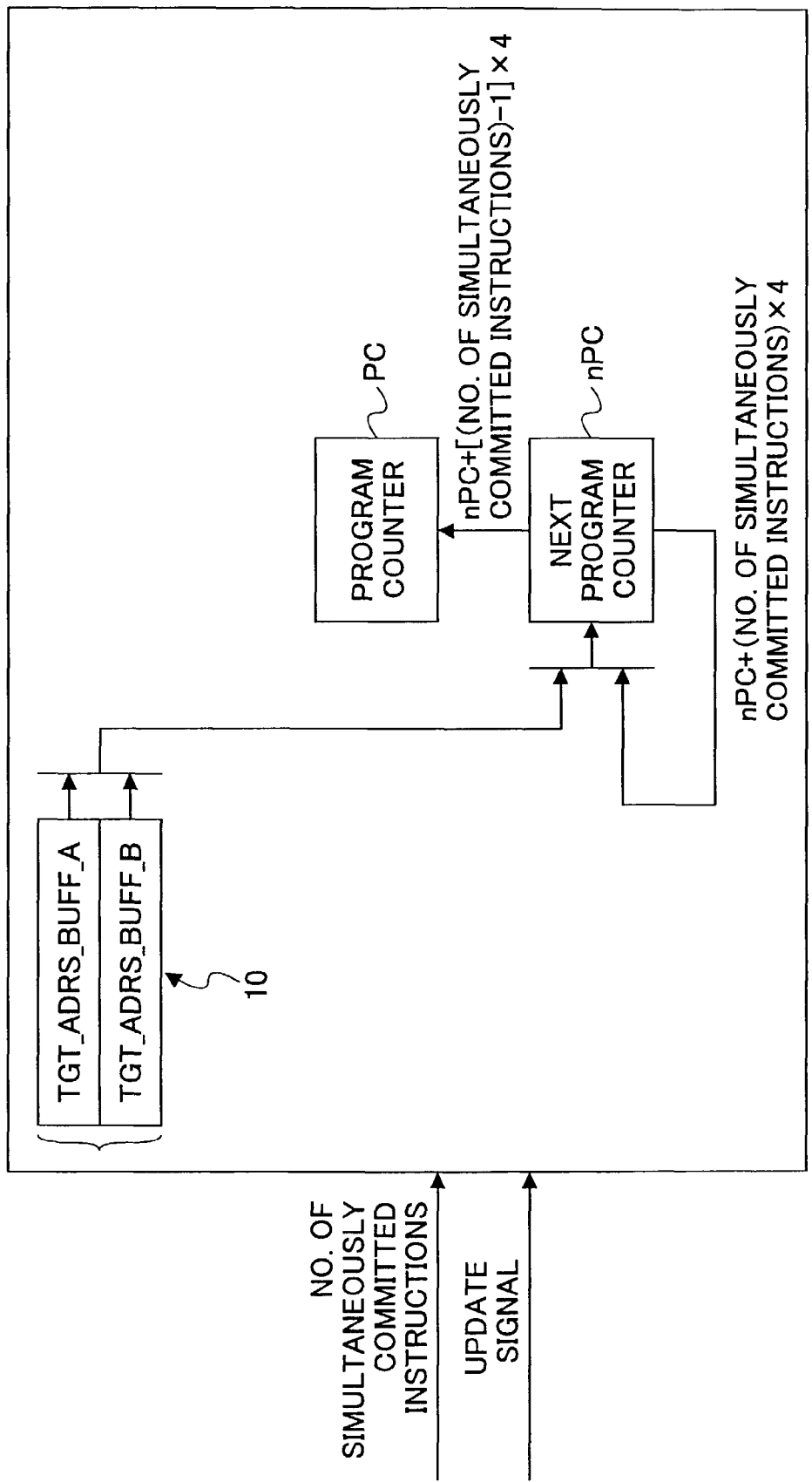
FIG. 7 is a system block diagram showing a structure of the program counter section.

FIG. 7 is a system block diagram showing a structure of the program counter section 11. The program counter PC and the next program counter nPC of the program counter section 11 are simultaneously updated during the cycle W after the committing of the instruction (instruction commit cycle). The updating is roughly categorized into the following 4 cases (1) through (4).

Case (1): A plurality of instructions are committed simultaneously, and a branch instruction which branches does not exist in these plurality of instructions.

Case (2): A plurality of instructions are committed simultaneously, and a branch instruction which branches exists in these plurality of instructions.

Case (3): An instruction is executed by exceeding the 4-Gbyte boundary.

Case (4): An interrupt is generated by an instruction when this instruction is committed.

Basically, the program counter PC and the next program counter nPC of the program counter section 11 are updated to PC=nPC+[(number of simultaneously committed instructions)−1]×4 and nPC=nPC+[(number of simultaneously committed instructions)×4] or the branching destination address. Accordingly, the program counter PC and the next program counter nPC are updated to PC=nPC+[(number of simultaneously committed instructions)−1]×4 and nPC=PC+4 or the branching destination address.

In this embodiment, annulling the delay instruction (delay slot stack (DSS) instruction) of the branch instruction, is realized by replacing the DSS instruction which is to be annulled by a Non-Operation (NOP) instruction. The program counter PC and the next program counter nPC of the program counter section 11 are updated similarly as when the instruction is executed. Accordingly, when the branch instruction which does not branch is committed and when the branch instruction is not included in the group of instructions which are committed simultaneously, that is, in the Case (1) described above, the program counter PC and the next program counter nPC are updated to PC=nPC+[(number of simultaneously committed instructions)−1]×4 and nPC=PC+4. If an interrupt is permitted upon completion of the DSS instruction which is replaced by the NOP instruction when the DSS instruction is annulled, the value of the program counter PC becomes visible from outside the processor when the DSS instruction ends. Since the DSS instruction which is replaced by the NOP instruction is actually not executed, a return from the interrupt is made to an erroneous executing instruction sequence if the program counter PC holds the value PC=(instruction address of the DSS instruction which is replaced by the NOP instruction). Hence, in order prevent such a return to an erroneous executing instruction sequence, this embodiment further updates the values of the program counter PC and the next program counter nPC by an amount (4 bytes) corresponding to the DSS instruction.

When the branch instruction which branches is committed simultaneously as a plurality of instructions, this branch instruction can be committed simultaneously as a preceding instruction but cannot be committed simultaneously as a subsequent instruction. In other words, when the branch instruction which branches is committed, this branch instruction is always a last of the group of instructions which are committed simultaneously, and corresponds to the Case (2) described above, and thus, the program counter PC and the next program counter nPC become PC=(instruction address of the DSS instruction) and nPC=(branching destination address of the branch instruction).

In this embodiment, restrictions are provided upon completion of the branch instruction which branches, so as to simplify the updating circuits 11-2 and 11-3 for the program counter PC and the next program counter nPC. However, by notifying to the updating circuit 11-2 for the program counter PC a number of instructions subsequent to the branch instruction which branches and committed simultaneously, the restrictions become unnecessary upon completion of the branch instruction which branches, because the program counter PC and the next program counter nPC become PC=TGT_PC+[(number of simultaneously committed instructions subsequent to the branch instruction)×4] and nPC=PC+4.

TGT_PC of the branch instruction which branches is set from the branching destination address register 10 to the next program counter nPC during the cycle W. When the branch instruction which branches is committed, an instruction ID (IID) of this branch instruction is supplied from the instruction complete controller 9 during the cycle W, and TGT_PC [31:0,P3:P0] is set with respect to the next program counter nPC from an entry of the branching destination address register 10 having the same IID. The entry of the branching destination address register 10 is released simultaneously as the above setting of the next program counter nPC, and it becomes possible to set a new entry in the branching destination address register 10.

When the branching instruction is committed, this branching instruction branches, and the branching destination address exceeds the 4-Gbyte boundary, the operation of this embodiment becomes as follows. That is, since the program counter PC can be obtained from PC=nPC+[(number of simultaneously committed instructions)−1]×4, no special control is required. Further, because the next program counter nPC becomes nPC=(branching destination address), the next program counter nPC is set from the branching destination address register 10, but the branching destination address register 10 only holds the lower 32 bits (+4 PARITY) of the address. For this reason, in a case where the committed branch instruction is for instruction relative branching, the upper 32 bits (+4 PARITY) are generated based on TGT_PC_CARRY and TGT_PC_BORROW which are held in the branching destination address register 10. Whether or not the branching destination address exceeds the 4-Gbyte boundary may be judged by determining whether or not one of TGT_PC_CARRY and TGT_PC_BORROW is "1". TGT_PC_CARRY and TGT_PC_BORROW will not simultaneously become "1".

In a case where the committed branch instruction is for register relative branching, the branching destination address is generated by the execution unit 23. The lower 32 bits (+4 PARITY) of the address are obtained from the branching destination address register 10. With regard to the upper 32 bits (+4 PARITY) of the address, the upper 32 bits (+4 PARITY) are supplied to the program counter section 11 simultaneously as the supply of the lower 32 bits (+4 PARITY) to the branch instruction controller 7, after generation of the branching destination address in the execution unit 23. In this state, IID[5:0] of the branch instruction which generated the branching destination address is supplied from the execution unit 23 to the branch instruction controller 7 and the program counter section 11, simultaneously as the branching destination address. The upper 32 bits (+4 PARITY) of the branching destination address and the IID[5:0] at this time are held in the program counter section 11. In this embodiment, the latch circuit 11-1 for holding an amount corresponding to one instruction is provided in the program counter section 11. The upper 32 bits of the supplied branching destination address and the upper 32 bits of the program counter PC are compared, and if the compared upper 32 bits do not match, it is judged that the 4-Gbyte boundary is exceeded, and a signal +JMPL_RETURN_TGT_EQ_PC_HIGH becomes 0.

In a case where the register relative branch branches and the instruction is committed, if the IID of the committed instruction matches the IID held in the latch circuit 11-1 within the program counter section 11, the upper 32 bits (+4 PARITY) of the branching destination address is set by this latch circuit 11-1 of the program counter section 11. In the case where the register relative branch branches, the upper 32 bits (+4 PARITY) are supplied from the latch circuit 11-1 and the lower 32 bits (+4 PARITY) are supplied from the branching destination address register 10 and set in the next program counter nPC, regardless of whether or not the branching destination address exceeds the 4-Gbyte boundary. But when the branching destination address exceeds the 4-Gbyte boundary, the signal +JMPL_RETURN_TGT_EQ_PC_HIGH becomes 0.

When the instruction sequence is executed by exceeding the 4-Gbyte boundary, since the instruction fetch part 2 fetches the instruction using the value immediately prior to the boundary with respect to the upper 32 bits of the instruction fetch address, the instruction fetch part 2 must refetch the instruction at the point in time when the instruction immediately prior to the boundary is committed. This is because, the value of the upper 32 bits of the instruction address differs between the instruction immediately prior to the boundary and the instruction immediately after the boundary. Accordingly, in this embodiment, an instruction refetch request REIFCH is supplied from the program counter section 11 to the instruction fetch part 2 after the instruction immediately prior to the boundary is committed. In this state, the value of the program counter PC is updated to the instruction address immediately after the boundary, and thus, the instruction fetch part 2 resumes the instruction fetch from the value of the program counter PC.

If an interrupt is generated when the instruction is committed and the instruction control unit is restarted after the interrupt process ends, a state where nPC≠PC+4 may be generated. In this case, the instruction refetch request REIFCH is supplied from the program counter section 11 to the instruction fetch part 2, and although the requested address is the address indicated by the program counter PC, the instruction which is to be executed next is the instruction at the address indicated by the next program counter nPC. Accordingly, in this case, the instruction fetch is once made using the address indicated by the program counter PC, and when one instruction (instruction at the address indicated by the program counter PC) is committed, the program counter PC and the next program counter nPC are updated before the instruction refetch request REIFCH is again supplied to the instruction fetch part 2. This is because, when the instruction refetch request REIFCH is supplied from the program counter section 11, the instruction fetch part 2 makes an instruction fetch using the address indicated by the program counter PC and attempts to supply the subsequent instruction.

When the delay slot instruction of the branch instruction is annulled, the instruction control is made by treating the delay slot instruction as the NOP instruction. Hence, if an interrupt is generated when the branch instruction immediately preceding the annulled delay slot instruction is committed, the program counter PC and the next program counter nPC become PC=(address of the annulled delay slot instruction) and nPC= (address of the instruction which is to be actually executed next to the branch instruction). In this state, when a restart is made using the interrupt process, the restart would occur from the annulled delay slot instruction which should actually not be executed. Accordingly, in this embodiment, if the interrupt is generated when the branch instruction is committed, a signal +FORCE_NOP_TGR is set to 1 (ON) when annulling the subsequent delay slot instruction. Consequently, if the interrupt is generated when the signal +FORCE_NOP_TGR is 1 (ON), the program counter PC and the next program counter nPC are once updated, and the program counter PC and the next program counter nPC are thereafter updated again during the interrupt process to PC=nPC and nPC=nPC+4.

Next, a description will be given of a structure of the branch instruction controller 7, by referring to FIGS. 8 through 11. FIGS. 8 through 11 are logic circuit diagrams showing important parts within the branch instruction controller 7.

Figure 8:
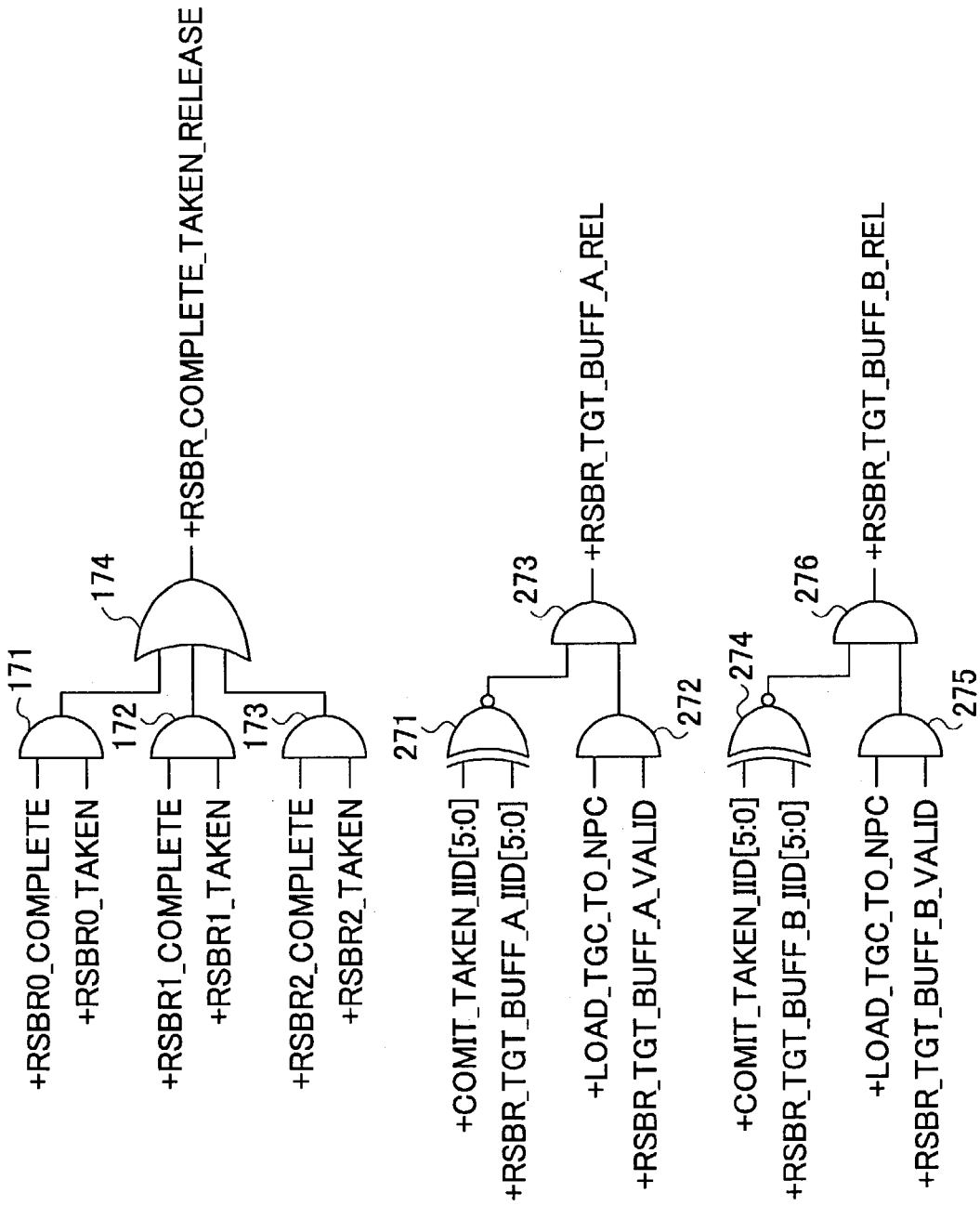
FIG. 8 is a logic circuit diagram showing an important part within the branch instruction controller.

In FIG. 8, AND circuits 171 through 173 and an OR circuit 174 generate a signal +RSBR_COMPLETE_TAKEN_RELEASE which becomes "1" when the control of at least one branch instruction which branches is completed in the branch instruction controller 7. A signal +RDBR0_COMPLETE which becomes "1" when the control of the branch instruction at the 0th entry of the branch instruction controller 7 is completed, and a signal +RSBR0_TAKEN which becomes "1" when the branching of the branch instruction at the 0th entry of the branch instruction controller 7 becomes definite, are input to the AND circuit 171. Similarly, a signal +RDBR1_COMPLETE which becomes "1" when the control of the branch instruction at the 1st entry of the branch instruction controller 7 is completed, and a signal +RSBR1_TAKEN which becomes "1" when the branching of the branch instruction at the 1st entry of the branch instruction controller 7 becomes definite, are input to the AND circuit 172. In addition, a signal +RDBR2_COMPLETE which becomes "1" when the control of the branch instruction at the 2nd entry of the branch instruction controller 7 is completed, and a signal +RSBR2_TAKEN which becomes "1" when the branching of the branch instruction at the 2nd entry of the branch instruction controller 7 becomes definite, are input to the AND circuit 173. Outputs of the AND circuits 171 through 173 are input to the OR circuit 174.

An exclusive-NOR circuit 271 and AND circuits 272 and 273 compare the IID of the branch instruction held in the entry A within the branching destination address register 10 within the branch instruction controller 7 and the IID of the branch instruction which branches when this branch instruction is committed. A signal +COMIT_TAKEN_IID[5:0] which indicates the IID of the branch instruction which branches when this branch instruction is committed within the branch instruction controller 7 (or the program counter section 11), and a signal +RSBR_TGT_BUFF_A_IID[5:0] which indicates the IID of the branch instruction which is held in the entry A of the branching destination address register 10 and is within the branch instruction controller 7, are input to the exclusive-NOR circuit 271. The signal +RSBR_TGT_BUFF_A_IID[5:0] is equivalent to a signal +TARGET_ADRS_BUFFER_A_IID[5:0] which will be described later. A signal +LOAD_TGT_TO_NPC which becomes "1" when it is necessary to set a value in the next program counter nPC from the branching destination address register 10, and a signal +RSBR_TGT_BUFF_A_VALID which becomes "1"

when the entry A within the branching destination address register 10 is valid, are input to the AND circuit 272. Outputs of the exclusive-NOR circuit 271 and the AND circuit 272 are input to the AND circuit 273.

An exclusive-NOR circuit 274 and AND circuits 275 and 276 compare the IID of the branch instruction held in the entry B within the branching destination address register 10 within the branch instruction controller 7 and the IID of the branch instruction which branches when this branch instruction is committed. The signal +COMIT_TAKEN_IID [5:0] which indicates the IID of the branch instruction which branches when this branch instruction is committed within the branch instruction controller 7 (or the program counter section 11), and a signal +RSBR_TGT_BUFF_B_IID[5:0] which indicates the IID of the branch instruction which is held in the entry B of the branching destination address register 10 and is within the branch instruction controller 7, are input to the exclusive-NOR circuit 274. The signal +RSBR_TGT_BUFF_B_IID[5:0] is equivalent to a signal +TARGET_ADRS_BUFFER_B_IID[5:0] which will be described later. The signal +LOAD_TGT_TO_NPC which becomes "1" when it is necessary to set a value in the next program counter from the branching destination address register 10, and a signal +RSBR_TGT_BUFF_B_VALID which becomes "1" when the entry B within the branching destination address register 10 is valid, are input to the AND circuit 275. Outputs of the exclusive-NOR circuit 274 and the AND circuit 275 are input to the AND circuit 276.

Figure 9:
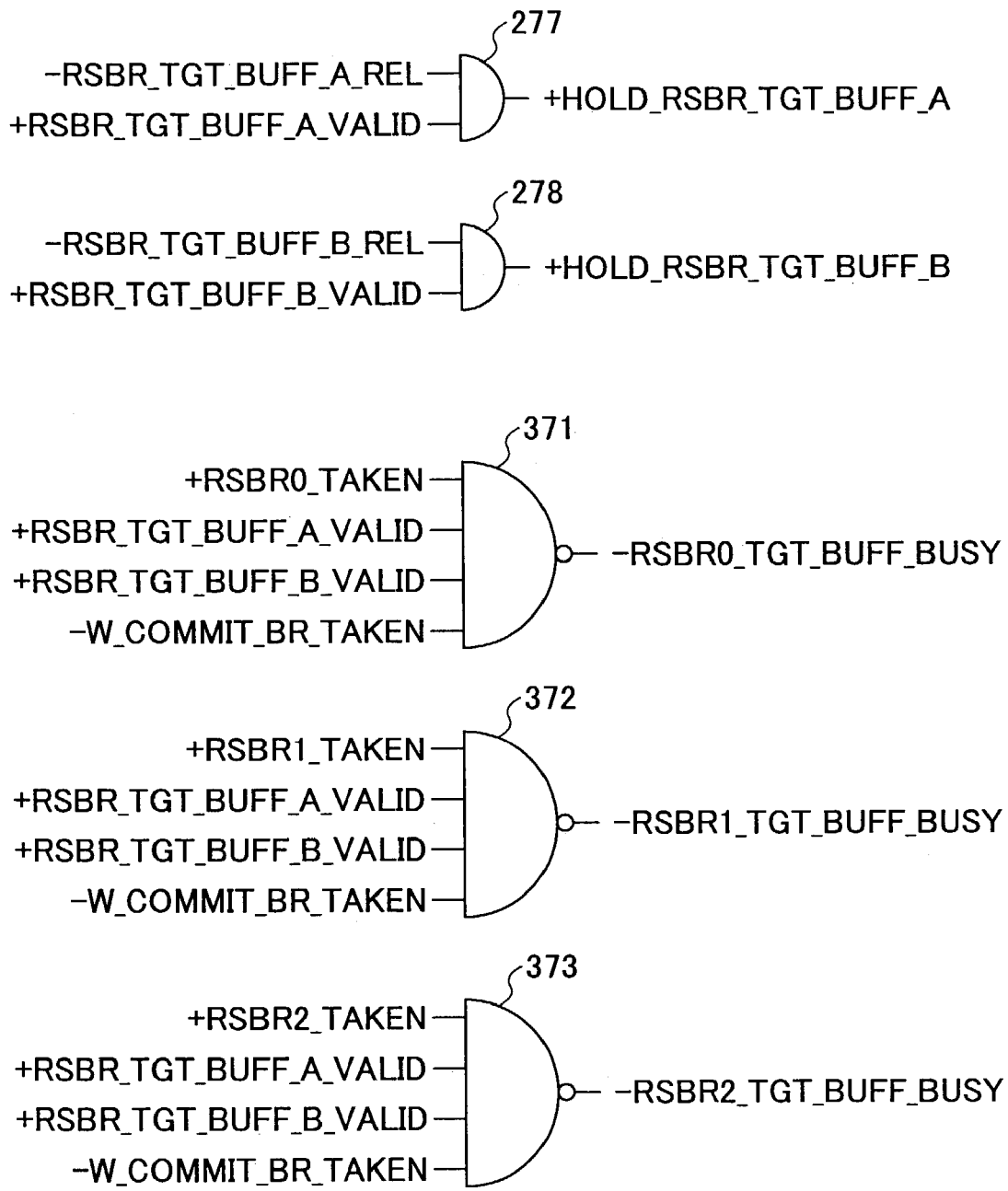
FIG. 9 is a logic circuit diagram showing an important part within the branch instruction controller.

In FIG. 9, an AND circuit 277 generates a clock enable signal +HOLD_RSBR_TGT_BUFF_A with respect to the entry A of the branching destination address register 10, based on a signal −RSBR_TGT_BUFF_A_REL which becomes "1" when releasing the entry A of the branching destination address register 10 and a signal +RSBR_TGT_BUFF_A_VALID which becomes "1" when the entry A within the branching destination address register 10 is valid. An AND circuit 278 generates a clock enable signal +HOLD_RSBR_TGT_BUFF_B with respect to the entry B of the branching destination address register 10, based on a signal −RSBR_TGT_BUFF_B_REL which becomes "1" when releasing the entry B of the branching destination address register 10 and a signal +RSBR_TGT_BUFF_B_VALID which becomes "1" when the entry B within the branching destination address register 10 is valid.

A NAND circuit 371 generates a signal −RSBR0_TGT_BUFF_BUSY which indicates that no vacant entry exists in the branching destination address register 10 when the branch instruction at the 0th entry of the branch instruction controller 7 is a branch instruction which branches, based on a signal +RSBR0_TAKEN which becomes "1" when the branching of the branch instruction at the 0th entry of the branch instruction controller 7 becomes definite, the signal +RSBR_TGT_BUFF_A_VALID which becomes "1" when the entry A within the branching destination address register 10 is valid, the signal +RSBR_TGT_BUFF_B_VALID which becomes "1" when the entry B within the branching destination address register 10 is valid, and a signal −W_COMMIT_BR_TAKEN which indicates that the branch instruction which branches is committed. The signal −W_COMMIT_BR_TAKEN is a signal in the cycle W, and becomes "1" with a cycle corresponding to when the branch instruction which branches is committed plus (+) 1τ.

A NAND circuit 372 generates a signal −RSBR1_TGT_BUFF_BUSY which indicates that no vacant entry exists in the branching destination address register 10 when the branch instruction at the 1st entry of the branch instruction controller 7 is a branch instruction which branches, based on a signal +RSBR1_TAKEN which becomes "1" when the branching of the branch instruction at the 1st entry of the branch instruction controller 7 becomes definite, the signal +RSBR_TGT_BUFF_A_VALID which becomes "1" when the entry A within the branching destination address register 10 is valid, the signal +RSBR_TGT_BUFF_B_VALID which becomes "1" when the entry B within the branching destination address register 10 is valid, and a signal −W_COMMIT_BR_TAKEN which indicates that the branch instruction which branches is committed. The signal −W_COMMIT_BR_TAKEN is a signal in the cycle W, and becomes "1" with the cycle corresponding to when the branch instruction which branches is committed plus (+) 1τ.

A NAND circuit 373 generates a signal −RSBR2_TGT_BUFF_BUSY which indicates that no vacant entry exists in the branching destination address register 10 when the branch instruction at the 0th entry of the branch instruction controller 7 is a branch instruction which branches, based on a signal +RSBR2_TAKEN which becomes "1" when the branching of the branch instruction at the 2nd entry of the branch instruction controller 7 becomes definite, the signal +RSBR_TGT_BUFF_A_VALID which becomes "1" when the entry A within the branching destination address register 10 is valid, the signal +RSBR_TGT_BUFF_B_VALID which becomes "1" when the entry B within the branching destination address register 10 is valid, and a signal −W_COMMIT_BR_TAKEN which indicates that the branch instruction which branches is committed. The signal +W_COMMIT_BR_TAKEN is a signal in the cycle W, and becomes "1" with the cycle corresponding to when the branch instruction which branches is committed plus (+) 1τ.

Figure 10:
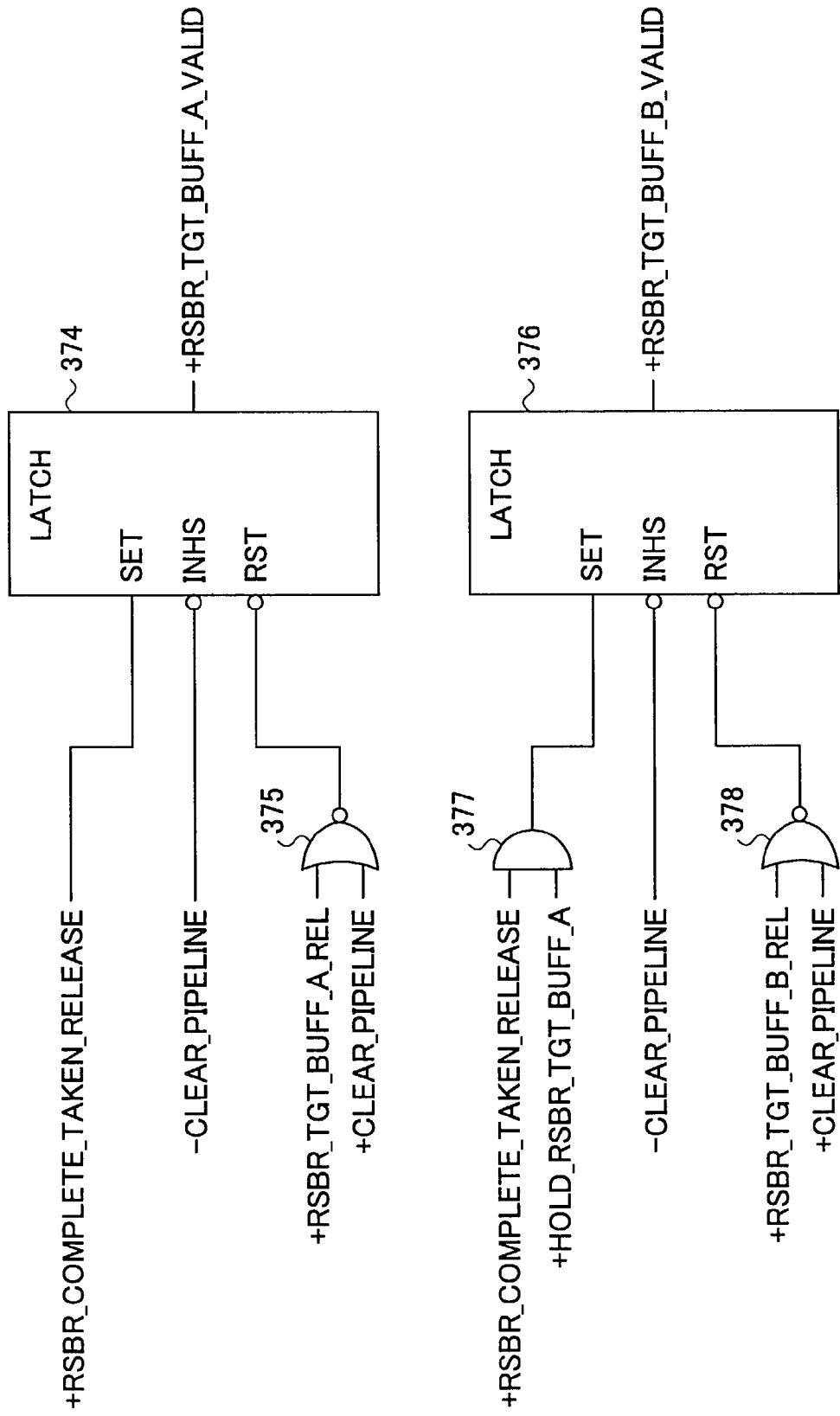
FIG. 10 is a logic circuit diagram showing an important part within the branch instruction controller.

In FIG. 10, a signal +RSBR_COMPLETE_TAKEN_RELEASE is input to a set terminal SET of a latch circuit 374, and a signal −CLEAR_PIPELINE which indicates that all instructions in the executing pipeline are to be cleared is input to an input terminal INHS of the latch circuit 374. The signals +RSBR_TGT_BUFF_A_REL and +CLEAR_PIPELINE are input to a NOR circuit 375, and an output of this NOR circuit 375 is input to a reset terminal RST of the latch circuit 374. The latch circuit 374 generates the signal +RSBR_TGT_BUFF_A_VALID described above.

The signal +RSBR_COMPLETE_TAKEN_RELEASE and the clock enable signal +HOLD_RSBR_TGT_BUFF_A are input to an AND circuit 377, and an output of this AND circuit 377 is input to a set terminal SET of a latch circuit 376. The signal −CLEAR_PIPELINE which indicates that all instructions in the executing pipeline are to be cleared is input to an input terminal INHS of the latch circuit 376. The signals +RSBR_TGT_BUFF_B_REL and +CLEAR_PIPELINE are input to a NOR circuit 378, and an output of this NOR circuit 378 is input to a reset terminal RST of the latch circuit 376. The latch circuit 376 generates the signal +RSBR_TGT_BUFF_B_VALID described above.

Figure 11:
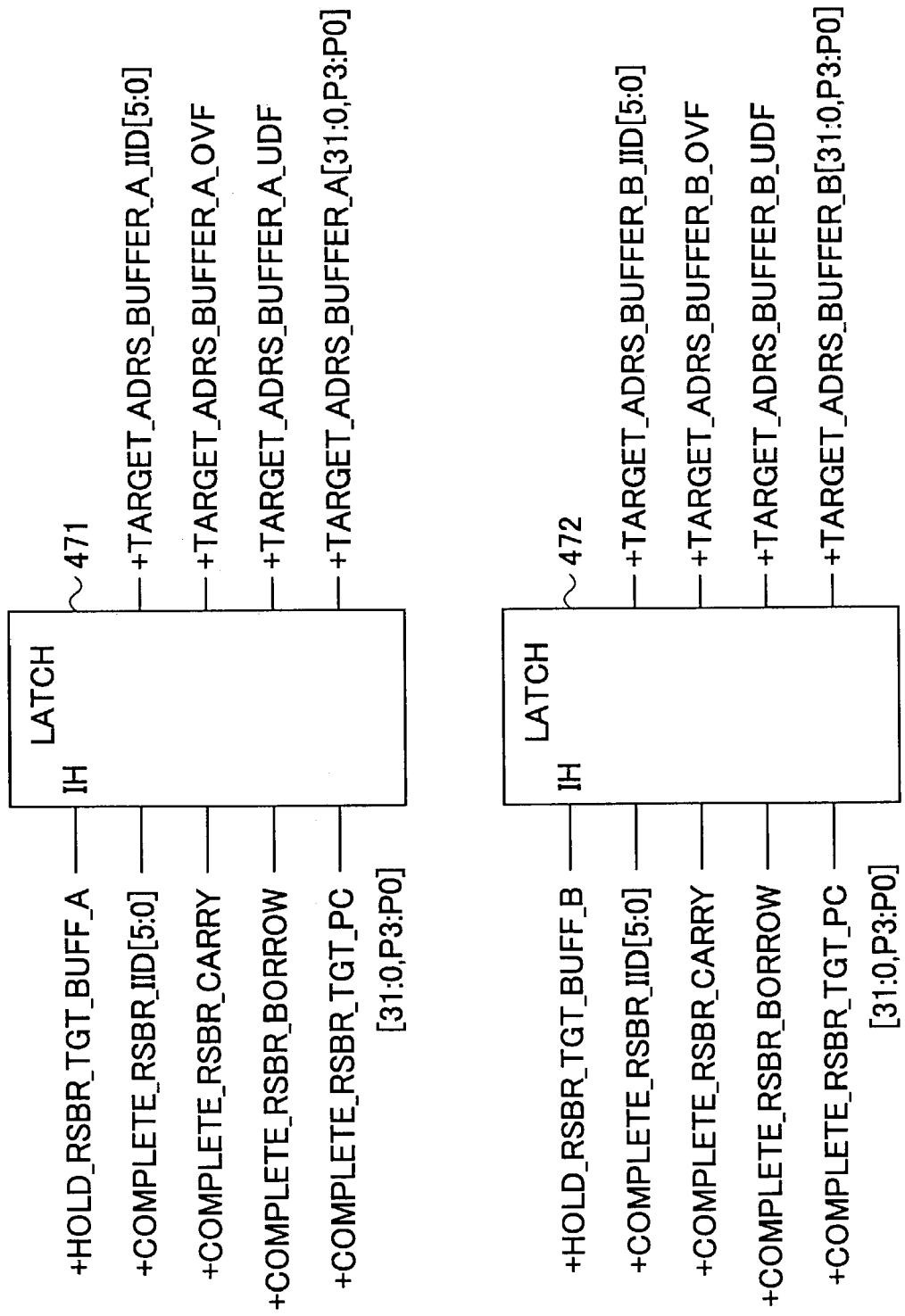
FIG. 11 is a logic circuit diagram showing an important part within the branch instruction controller.

In FIG. 11, the signals +HOLD_RSBR_TGT_BUFF_A, +COMPLETE_RSBR_IID[5:0], +COMPLETE_RSBR_CARRY, +COMPLETE_RSBR_BORROW and +COMPLETE_RSBR_TGT_PC[31:0,P3:P0] are input to a latch circuit 471, and signals +TARGET_ADRS_BUFFER_A_IID[5:0], +TARGET_ADRS_BUFFER_A_OVF, +TARGET_ADRS_BUFFER_A_UDF and +TARGET_ADRS_A_BUFFER_A[31:0,P3:P0] are output from the latch circuit 471. The signal +HOLD_RSBR_TGT_BUFF_A is a clock enable signal for the entry A of the branching destination address register 10, and the signal +COMPLETE_RSBR_IID[5:0] is the IID of the branch instruction which is released (when the control of the branch instruction is completed) from the branch instruction controller 7. The signal +COMPLETE_RSBR_CARRY becomes "1" when a carry is generated at the branching destination address of the branch instruction which is released from the branch instruction controller 7, and the signal +COMPLETE_RSBR_BORROW becomes "1" when a borrow is generated at the branching destination address of the branch instruction which is released from the branch instruction controller 7. The signal +COMPLETE_RSBR_TGT_PC[31:0, P3:P0] is the branching destination address of the branch instruction which is released from the branch instruction controller 7. The signal +TARGET_ADRS_BUFFER_A_IID[5:0] is the IID of the branch instruction which is held in the entry A of the branching destination address register 10. The signal +TARGET_ADRS_BUFFER_A_OVF is the carry bit (CARRY) of the branch instruction held in the entry A of the branching destination address register 10, and the signal +TARGET_ADRS_BUFFER_A_UDF is the borrow bit (BORROW) of the branch instruction held in the entry A of the branching destination address register 10. The signal +TARGET_ADRS_BUFFER_A[31:0,P3:P0] is the branching destination address of the branch instruction held in the entry A of the branching destination address register 10.

The signals +HOLD_RSBR_TGT_BUFF_B, +COMPLETE_RSBR_IID[5:0], +COMPLETE_RSBR_CARRY, +COMPLETE_RSBR_BORROW and +COMPLETE_RSBR_TGT_PC[31:0,P3:P0] are input to a latch circuit 472, and signals +TARGET_ADRS_BUFFER_B_IID[5:0], +TARGET_ADRS_BUFFER_B_OVF, +TARGET_ADRS_BUFFER_B_UDF and +TARGET_ADRS_B_BUFFER_A[31:0,P3:P0] are output from the latch circuit 472. The signal +HOLD_RSBR_TGT_BUFF_B is a clock enable signal for the entry B of the branching destination address register 10, and the signal +COMPLETE_RSBR_IID[5:0] is the IID of the branch instruction which is released (when the control of the branch instruction is completed) from the branch instruction controller 7. The signal +COMPLETE_RSBR_CARRY becomes "1" when a carry is generated at the branching destination address of the branch instruction which is released from the branch instruction controller 7, and the signal +COMPLETE_RSBR_BORROW becomes "1" when a borrow is generated at the branching destination address of the branch instruction which is released from the branch instruction controller 7. The signal +COMPLETE_RSBR_TGT_PC[31:0,P3:P0] is the branching destination address of the branch instruction which is released from the branch instruction controller 7. The signal +TARGET_ADRS_BUFFER_B_IID[5:0] is the IID of the branch instruction which is held in the entry B of the branching destination address register 10. The signal +TARGET_ADRS_BUFFER_B_OVF is the carry bit (CARRY) of the branch instruction held in the entry B of the branching destination address register 10, and the signal +TARGET_ADRS_BUFFER_B_UDF is the borrow bit (BORROW) of the branch instruction held in the entry B of the branching destination address register 10. The signal +TARGET_ADRS_BUFFER_B[31:0,P3:P0] is the branching destination address of the branch instruction held in the entry B of the branching destination address register 10.

Figure 12:
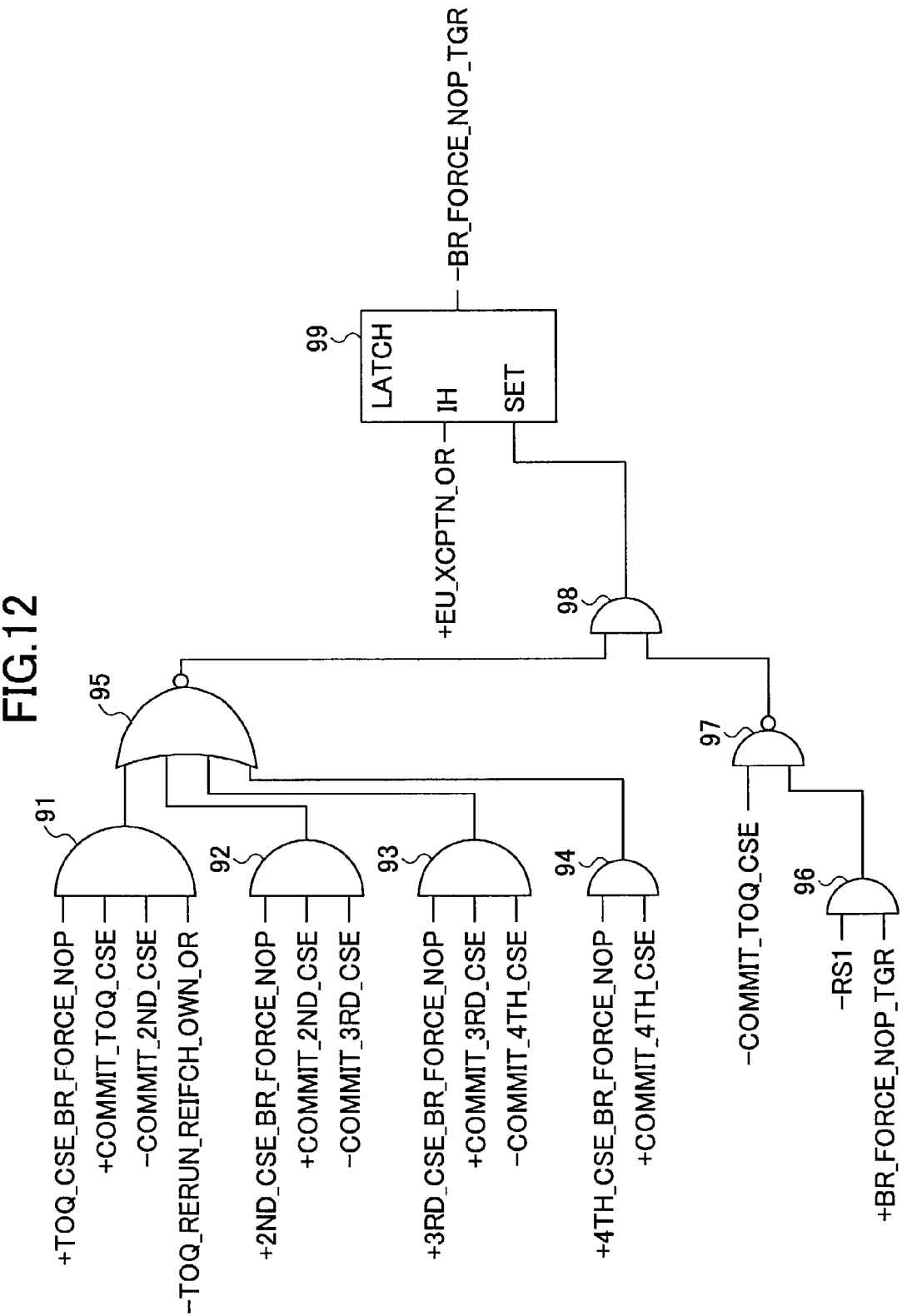
FIG. 12 is a logic circuit diagram showing an important part within an instruction completion controller.
Figure 13:
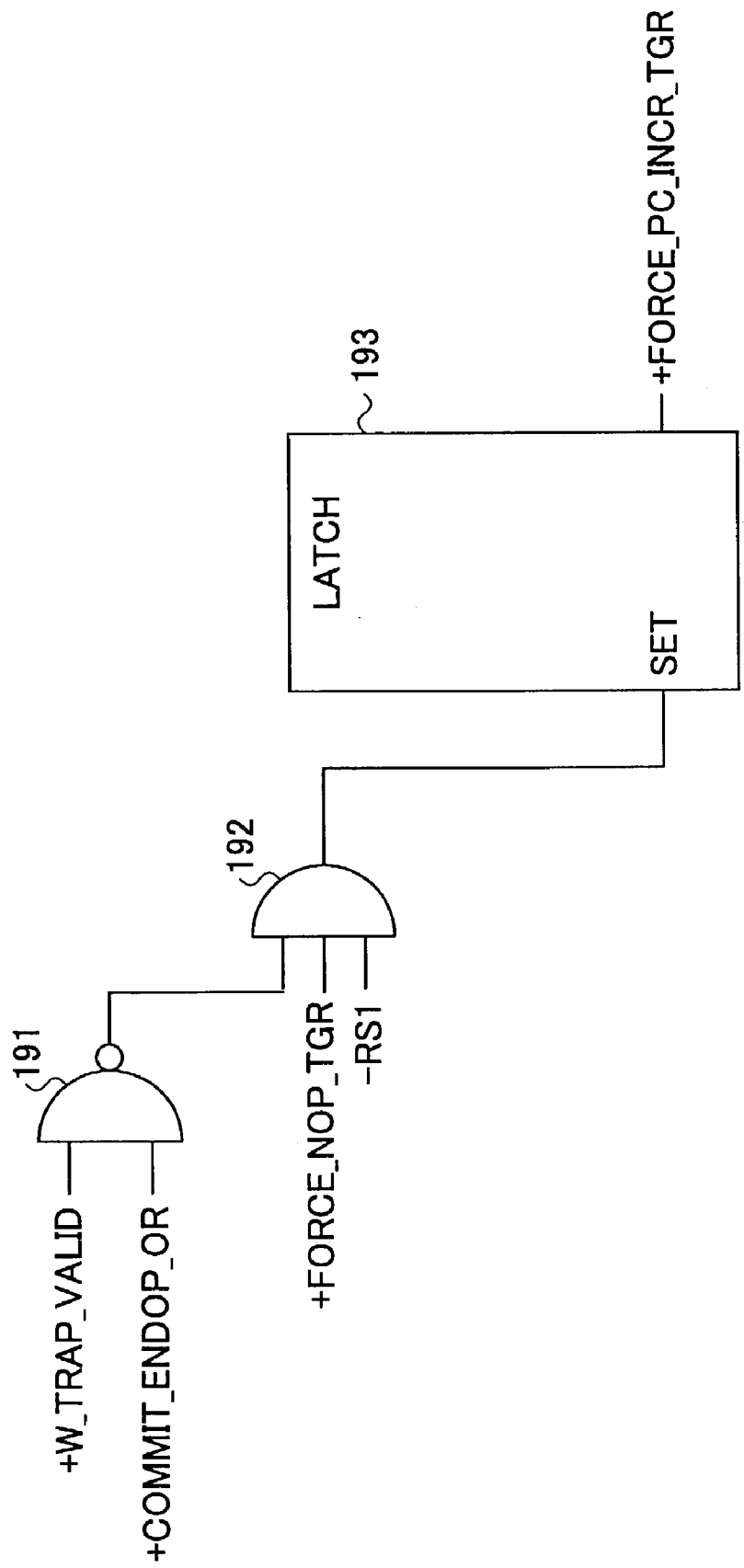
FIG. 13 is a logic circuit diagram showing an important part within the instruction completion controller.

Next, a description will be given of a structure of the instruction completion controller 9, by referring to FIGS. 12 and 13. FIGS. 12 and 13 are logic circuit diagrams showing important parts within the instruction completion controller 9.

In FIG. 12, a signal +TOQ_CSE_BR_FORCE_NOP which becomes "1" when the instruction which is committed first is the branch instruction and the subsequent delay instruction is to be annulled, a signal +COMMIT_TOQ_CSE which indicates that at least one instruction is committed, a signal −COMMIT_2ND_CSE which indicates that at least two instructions are committed, and a signal −TOQ_RERUN_REIFCH_OWN_OR which becomes "1" when the instruction which is committed first is to be reexecuted (RERUN) are input to an AND circuit 91. A signal +2ND_CSE_BR_FORCE_NOP which becomes "1" when the instruction which is committed second is the branch instruction and the subsequent delay instruction is to be annulled, a signal +COMMIT_2ND_CSE which indicates that at least two instructions are committed, and a signal −COMMIT_3RD_CSE which indicates that at least three instructions are committed are input to an AND circuit 92. A signal +3RD_CSE_BR_FORCE_NOP which becomes "1" when the instruction which is committed third is the branch instruction and the subsequent delay instruction is to be annulled, a signal +COMMIT_3RD_CSE which indicates that at least three instructions are committed, and a signal −COMMIT_4TH_CSE which indicates that at least four instructions are committed are input to an AND circuit 93. A signal +4TH_CSE_BR_FORCE_NOP which becomes "1" when the instruction which is committed fourth is the branch instruction and the subsequent delay instruction is to be annulled, and a signal +COMMIT_4TH_CSE which indicates that at least four instructions are committed are input to an AND circuit 94. Outputs of the AND circuits 91 through 94 are input to a NOR circuit 95.

A signal −RS1 which becomes "1" when an interrupt process is generated, and a signal +BR_FORCE_NOP_TGR which indicates that the next instruction which is first committed is the delay instruction which is changed to the NOP instruction are input to an AND circuit 96. A signal −COMMIT_TOQ_CSE which indicates that at least one instruction is committed, and an output of the AND circuit 96 are input to a NAND circuit 97. Outputs of the NOR circuit 95 and the NAND circuit 97 are input to an AND circuit 98. A signal +EU_XCPTN_OR which becomes "1" when an exception is generated in the execution unit 23 or the like is input to an input terminal 1H of a latch circuit 99. An output of the AND circuit 98 is input to a set terminal SET of the latch circuit 99. A signal −BR_FORCE_NOP_TGR which indicates that the next instruction which is committed first is the delay instruction which is changed to the NOP instruction is output from the latch circuit 99.

In FIG. 13, a signal +WTRAP_VALID of the cycle W, indicating that an instruction which carries out a trap process, and a signal +COMMIT_ENDOP_OR which indicates that at least one instruction is committed are input to a NAND circuit 191. An output of the NAND circuit 191, a signal +FORCE_NOP_TGR which becomes "1" when an asynchronous interrupt (external interrupt) is generated when the signal +BR_FORCE_NOP_TGR=1, and the signal −RS1 which becomes "1" when the interrupt process is generated are input to an AND circuit 192. An output of the AND circuit 192 is input to a set terminal SET of the latch circuit 193. The latch circuit 193 outputs a signal +FORCE_PC_INCR_TGR. The signal +FORCE_PC_INCR_TGR becomes "1" when the branch instruction is committed, the time until the delay slot instruction is committed is delayed and the program counter PC and the next program counter nPC must be updated by an amount corresponding to the delay slot instruction (4 bytes) when the interrupt process is generated. In other words, the signal +FORCE_PC_INCR_TGR rises after 1τ from the signal +FORCE_NOP_TGR, and becomes valid in a cycle W+1.

Next, a description will be given of the updating circuit 11-3 for the next program counter nPC within the program counter section 11, by referring to FIGS. 14 through 18. FIGS. 14 through 18 are logic circuit diagrams showing the updating circuit 11-3 within the program counter section 11.

Figure 14:
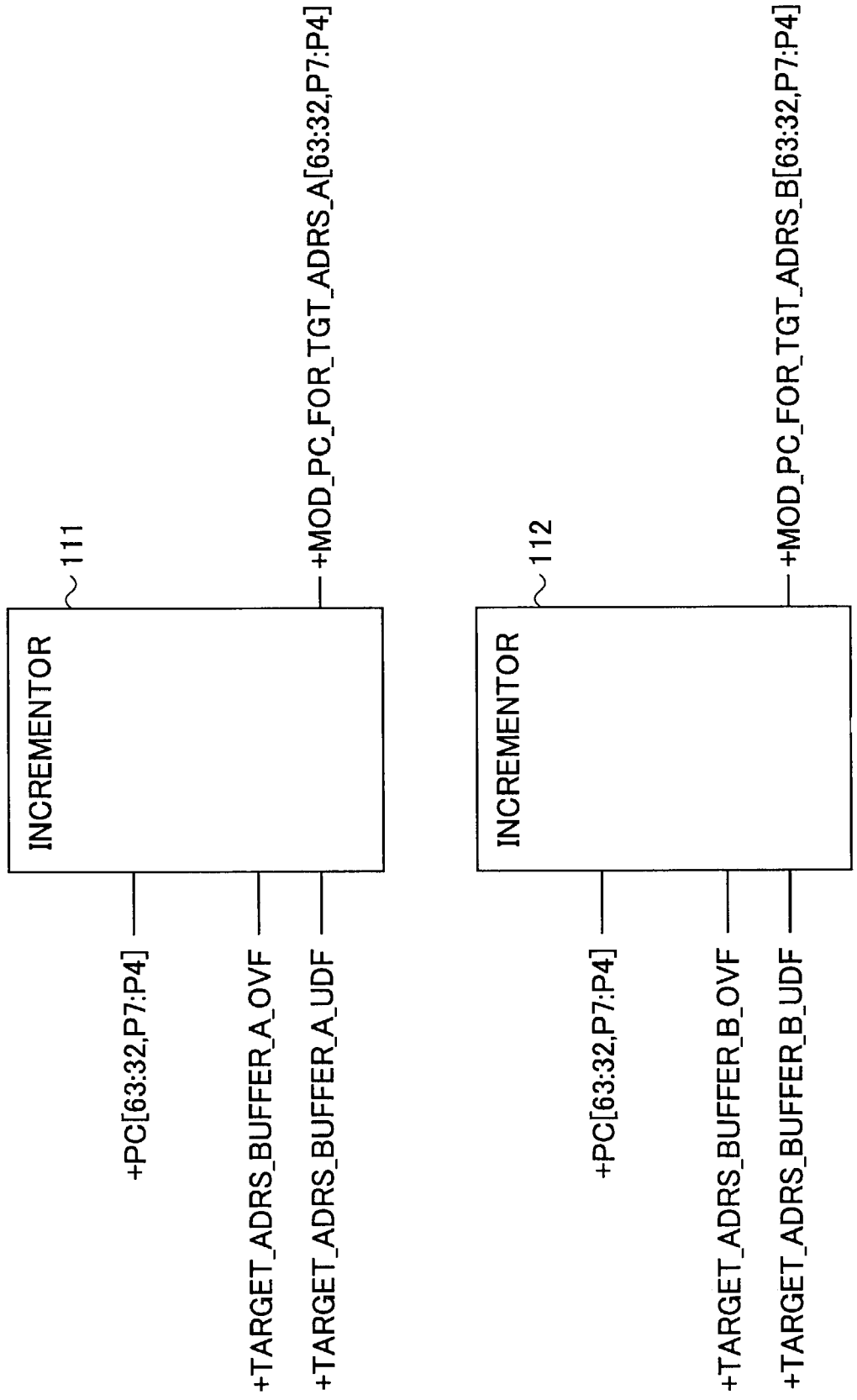
FIG. 14 is a logic circuit diagram showing a nPC updating circuit within the program counter section.

In FIG. 14, the signals +PC[63:32,P7:P4], +TARGET_ADRS_BUFFER_A_OVF and +TARGET_ADRS_BUFFER_A_UDF are input to an incrementor 111, and a signal +MOD_PC_FOR_TGT_ADRS_A[63:32,P7:P4] is output from the incrementor 111. The signal +MOD_PC_FOR_TGT_ADRS_A[63:32,P7:P4] indicates the upper portion of the branching destination address when the carry bit (CARRY) or the borrow bit (BORROW) is "1" in the entry A of the branching destination address register 10. The signals +PC[63:32,P7:P4], +TARGET_ADRS_BUFFER_B_OVF and +TARGET_ADRS_BUFFER_B_UDF are input to an incrementor 112, and a signal +MOD_PC_FOR_TGT_ADRS_B[63:32,P7:P4] is output from the incrementor 112. The signal +MOD_PC_FOR_TGT_ADRS_B[63:32,P7:P4] indicates the upper portion of the branching destination address when the carry bit (CARRY) or the borrow bit (BORROW) is "1" in the entry B of the branching destination address register 10.

Figure 15:
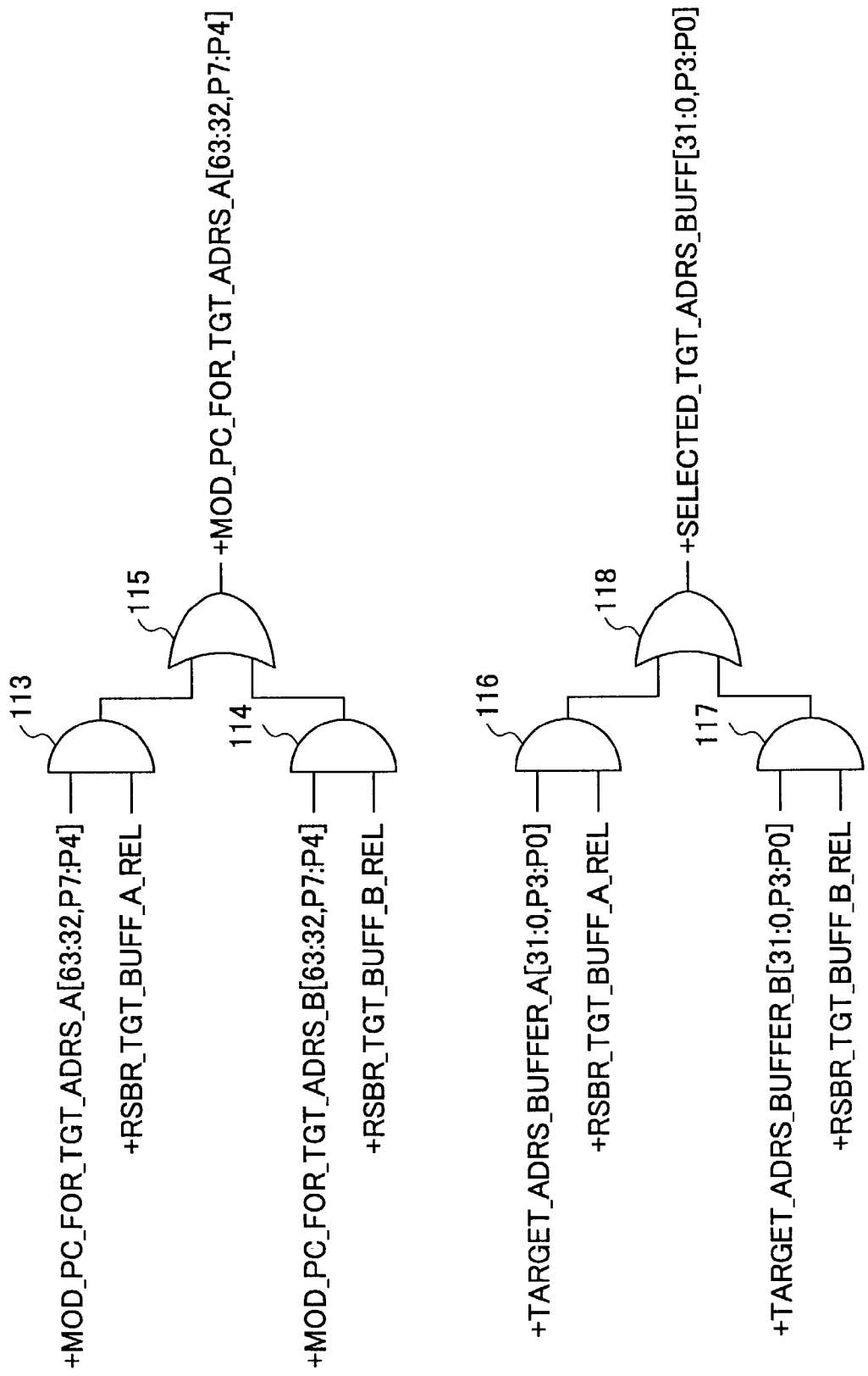
FIG. 15 is a logic circuit diagram showing the nPC updating circuit within the program counter section.

In FIG. 15, the signals +MOD_PC_FOR_TGT_ADRS_A [63:32,P7:P4] and +RSBR_TGT_BUFF_A_REL are input to an AND circuit 113, and the signals +MOD_PC_FOR_TGT_ADRS_B[63:32,P7:P4] and +RSBR_TGT_BUFF_B_REL are input to an AND circuit 114. An OR circuit 115 outputs a signal +MOD_PC_FOR_TGT_ADRS [63:32,P7:P4] based on outputs of the AND circuits 113 and 114. The signal +MOD_PC_FOR_TGT_ADRS[63:32,P7:P4] indicates the upper portion of the branching destination address which is set from the branching destination address register 10 to the next program counter nPC.

The signals +TARGET_ADRS_BUFFER_A[31:0,P3:P0] and +RSBR_TGT_BUFF_A_REL are input to an AND circuit 116, and signals +TARGET_ADRS_BUFFER_B[31:0,P3:P0] and +RSBR_TGT_BUFF_B_REL are input to an AND circuit 117. An OR circuit 118 outputs a signal +SELECTED_TGT_ADRS_BUFF[31:0,P3:P0] based on outputs of the AND circuits 116 and 117. The signal +SELECTED_TGT_ADRS_BUFF[31:0,P3:P0] indicates the lower portion of the branching destination address which is set from the branching destination address register 10 to the next program counter nPC.

Figure 16:
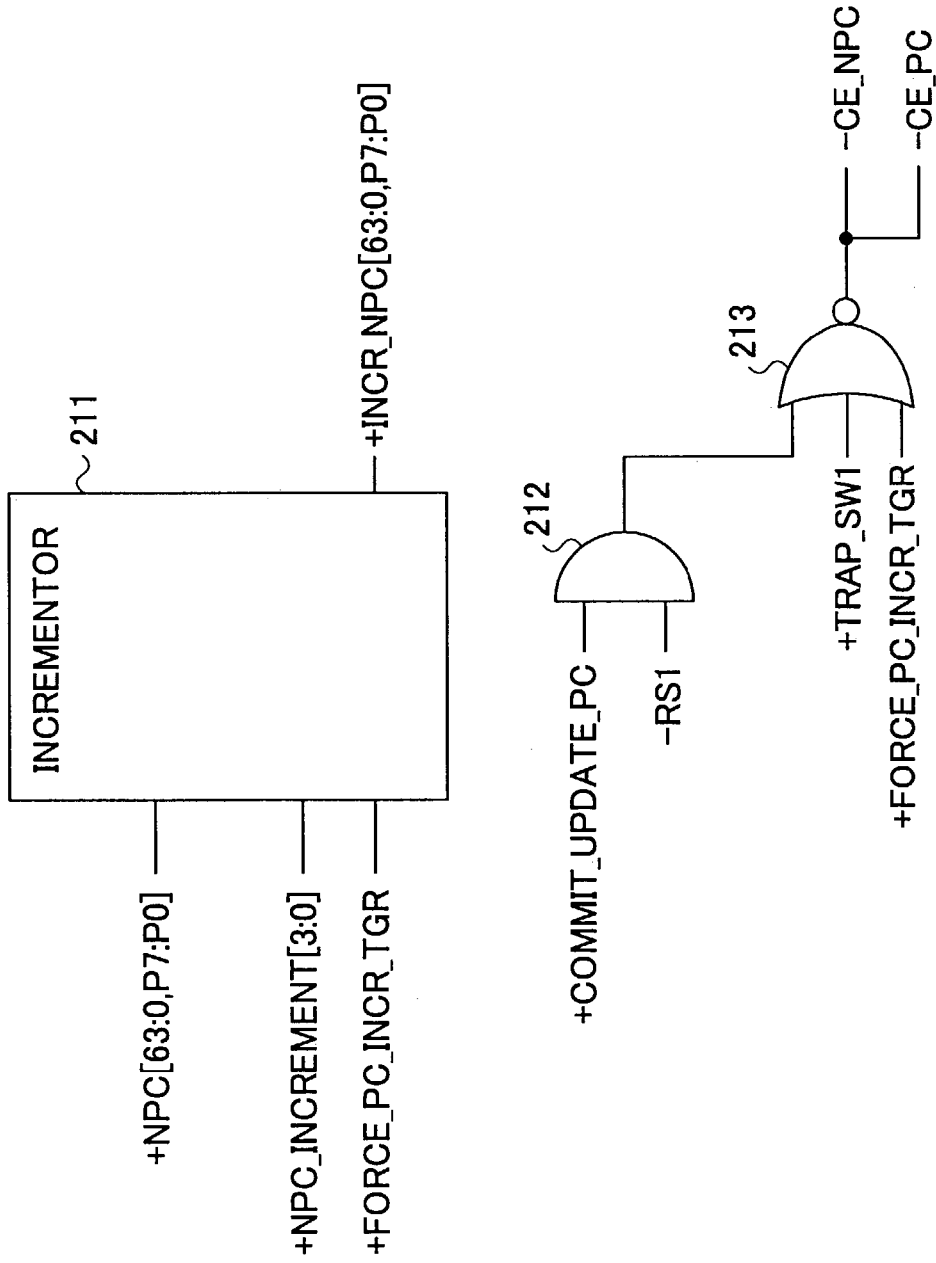
FIG. 16 is a logic circuit diagram showing the nPC updating circuit within the program counter section.

In FIG. 16, the signals +NPC[63:0,P7:P0], +NPC_INCREMENT[3:0] and +FORCE_PC_INCR_TGR are input to an incrementor 211, and the incrementor 211 outputs a signal +INCR_NPC[63:0,P7:P0]. The signal +NPC_INCREMENT [3:0] indicates the number of instructions which are committed simultaneously. For example, if bit 3 is "1", it is indicated that four instructions were committed simultaneously, and if bit 2 is "1", it is indicated that three instructions were committed simultaneously. The signal +INCR_NPC[63:0,P7:P0] indicates that an operation nPC+4 is carried out when +FORCE_NOP_TGR=1. In addition, signals +COMMIT_UPDATE_PC and –RS1 are input to an AND circuit 212. The signal +COMMIT_UPDATE_PC indicates that the program counter PC or the next program counter nPC needs to be updated. An output of the AND circuit 212, and signals +TRAP_SW1 and +FORCE_PC_INCR_TGR are input to a NOR circuit 213. An output of the NOR circuit 213 is used as a clock enable signal –CE_NPC of the next program counter nPC and as a clock enable signal –CE_PC of the program counter PC.

Figure 17:
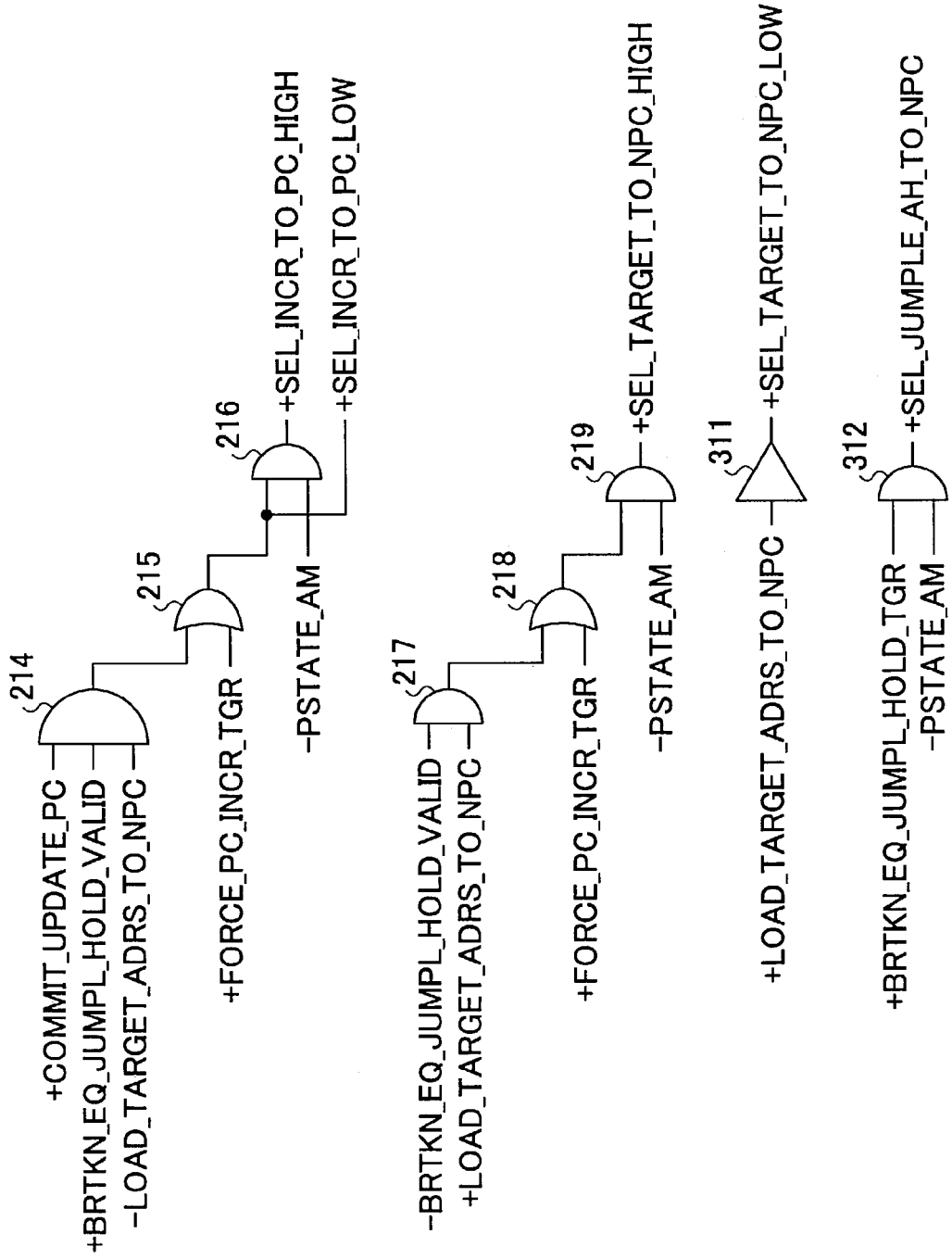
FIG. 17 is a logic circuit diagram showing the nPC updating circuit within the program counter section.

In FIG. 17, signals +COMMIT_UPDATE_PC, –BRTKN_EQ_JUMPL_HOLD_VALID and –LOAD_TARGET_ADRS_TO_NPC are input to an AND circuit 214. The signal –BRTKN_EQ_JUMPL_HOLD_VALID becomes "1" when the upper portion of the branching address of the register relative branch instruction which is committed is not all 0 (All 0) and is held in the latch circuit 11-1. An output of the AND circuit 214 and the signal +FORCE_PC_INCR_TGR are input to an OR circuit 215. An output signal +SEL_INCR_TO_NPC_LOW of the OR circuit 215 and a signal –PSTATE_AM are input to an AND circuit 216. The signal +SEL_INCR_TO_NPC_LOW becomes "1" when selecting the signal +INCR_NPC upon setting to the lower portion of the next program counter nPC. The signal –PSTATE_AM indicates a 32-bit address mode when "1". The AND circuit 216 outputs a signal +SEL_INCR_TO_NPC_HIGH. This signal +SEL_INCR_TO_NPC_HIGH becomes "1" when selecting the signal +INCR_NPC upon setting to the upper portion of the next program counter nPC.

The signals –BRTKN_EQ_JUMPL_HOLD_VALID and +LOAD_TARGET_ADRS_TO_NPC are input to an AND circuit 217. An output of the AND circuit 217 and the signal +FORCE_PC_INCR_TGR are input to an OR circuit 218. An output of the OR circuit 218 and the signal –PSTATE_AM are input to an AND circuit 219. The AND circuit 219 outputs a signal +SEL_TARGET_TO_NPC_HIGH. The signal +SEL_TARGET_TO_NPC_HIGH becomes "1" when selecting the signal +MOD_PC_FOR_TGT_ADRS upon setting to the higher portion of the next program counter nPC. In addition, a buffer 311 outputs a signal +SEL_TARGET_TO_NPC_LOW based on a signal +LOAD_TARGET_ADRS_TO_NPC. The signal +LOAD_TARGET_ADRS_TO_NPC becomes "1" when it is necessary to set a value from the branching destination address register 10 to the next program counter nPC. The +SEL_TARGET_TO_NPC_LOW becomes "1" when selecting the signal +SELECTED_TGT?ADRS_BUFF upon setting to the upper portion of the next program counter nPC. An AND circuit 312 outputs a signal +SEL_JUMPL_AH_TO_NPC based on the signals +BRTKN_EQ_JUMPL_HOLD_TGR and –PSTATE_AM. The signal +SEL_JUMPL_AH_TO_NPC becomes "1" when selecting a value (+JMPL_ADRS_HOLD) from the latch circuit 11-1 upon setting to the upper portion of the next program counter nPC.

Figure 18:
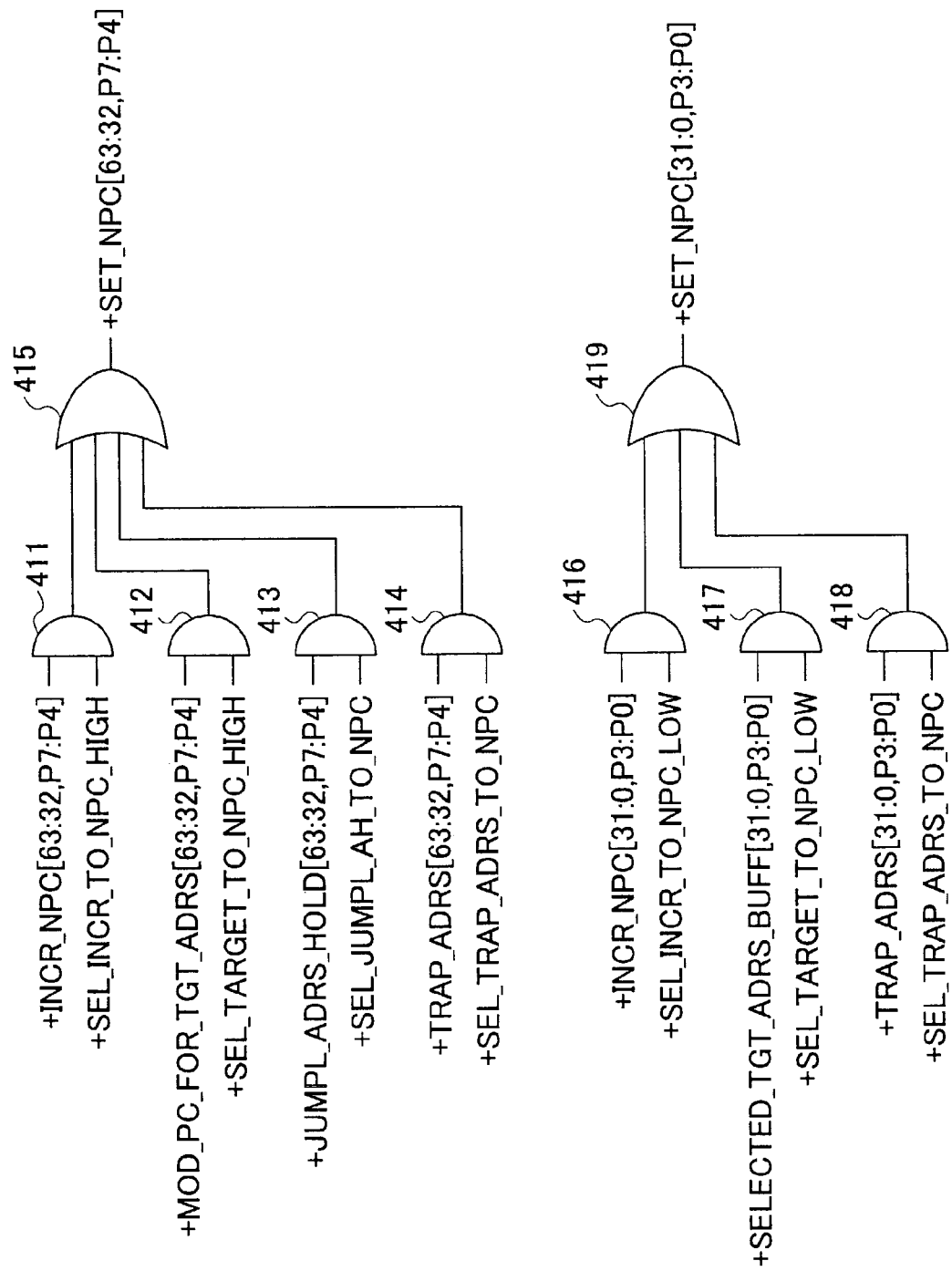
FIG. 18 is a logic circuit diagram showing the nPC updating circuit within the program counter section.

In FIG. 18, the signals +INCR_MPC[63:32,P7:P4] and +SEL_INCR_TO_NPC_HIGH are input to an AND circuit 411, and the signals +MOD_PC_FOR_TGT_ADRS[63:32,P7:P4] and +SEL_TARGET_TO_NPC_HIGH are input to an AND circuit 412. The signals +JUMPL_ADRS_HOLD[63:32,P7:P4] and +SEL_JUMPL_AH_TO_NPC are input to an AND circuit 413, and the signals +TRAP_ADRS[63:32,P7:P4] and +SEL_TRAP_ADRS_TO_NPC are input to an AND circuit 414. The signal +TRAP_ADRS[63:32,P7:P4] is defined by the SPARC architecture, and selects an exclusive trap (TRAP) address when the trap is generated (+W_TRAP_VALID=1). The signal +SEL_TRAP_ADRS_TO_NPC becomes "1" when selecting the signal +TRAP_ADRS upon generation of the trap. An OR circuit 415 outputs a set signal +SET_NPC[63:32,P7:P4] of the next program counter nPC based on outputs of the AND circuits 411 through 414. Signals +INCR_NPC[31:0,P3:P0] and +SEL_INCR_TO_NPC_LOW are input to an AND circuit 416, and signals +SELECTED_TGT_ADRS_BUFF[31:0,P3:P0] and +SEL_TARGET_TO_NPC_LOW are input to an AND circuit 417. Signals +TRAP_ADRS[31:0,P3:P0] and +SEL_TRAP_ADRS_TO_NPC are input to an AND circuit

418. An OR circuit 419 outputs a signal +SET_NPC[31:0,P3:P0] based on outputs of the AND circuits 416 through 418.

Figure 19:
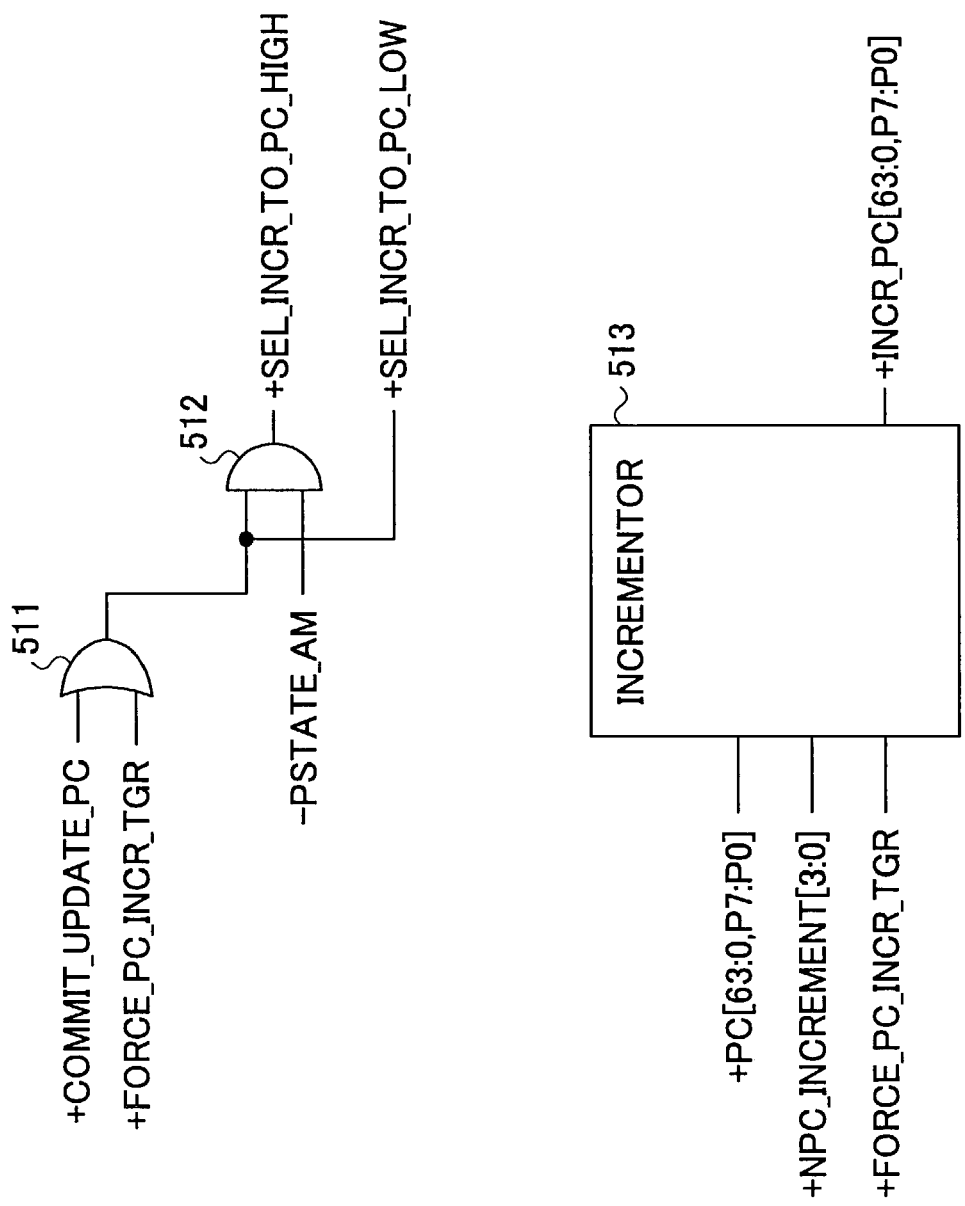
FIG. 19 is a logic circuit diagram showing a PC updating circuit within the program counter section.
Figure 20:
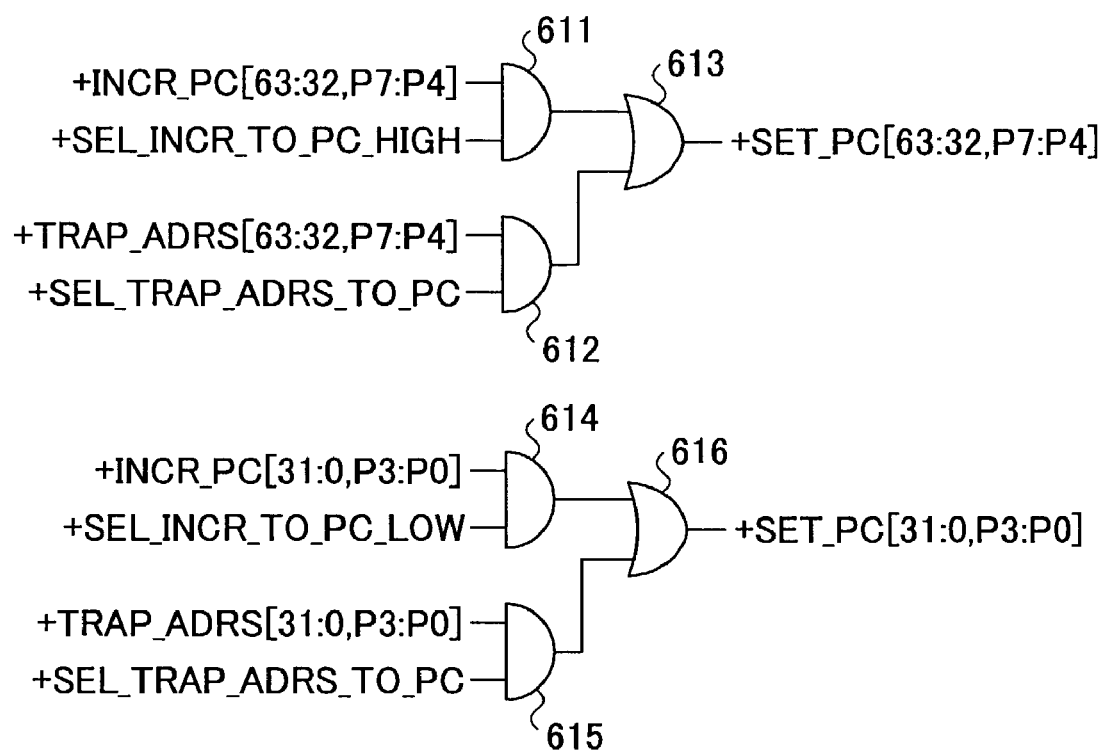
FIG. 20 is a logic circuit diagram showing the PC updating circuit within the program counter section.

Next, a description will be given of the updating circuit 11-2 for the program counter PC within the program counter section 11, by referring to FIGS. 19 and 20. FIGS. 19 and 20 are logic circuit diagrams showing the updating circuit 11-2 within the program counter section 11.

In FIG. 19, the signals +COMMIT_UPDATE_PC and +FORCE_PC_INCR_TGR are input to an OR circuit 511. An output signal +SEL_INCR_TO_PC_LOW of the OR circuit 511 and the signal −PSTATE_AM are input to an AND circuit 512. The signal +SEL_INCR_TO_PC_LOW becomes "1" when selecting the signal +INCR_PC upon setting to the lower portion of the program counter PC. The signal +INCR_PC indicates that (INCR_PC=)PC=nPC+[(number of simultaneously committed instructions)−1]×4 is calculated when +NPC_INCREMENT≠0, similarly to the signal +INCR_NPC shown in FIG. 16, and (INCR_PC=)PC=nPC when +FORCE_PC_INCR_TRG=1. The signal +NPC_INCREMENT and the signal +FORCE_PC_INCR_TGR do not become valid simultaneously. The AND circuit 512 outputs a signal +SEL_INCR_TO_PC_HIGH. The signal +SEL_INCR_TO_PC_HIGH becomes "1" when selecting the signal +INCR_PC upon setting to the upper portion of the program counter PC. In addition, the signals +PC[63:0,P7:P0], +NPC_INCREMENT[3:0] and +FORCE_PC_INCR_TGR are input to an incrementor 513, and the incrementor 513 outputs a signal +INCR_PC[63:0,P7:P0].

In FIG. 20, signals +INCR_PC[63:32,P7:P4] and +SEL_INCR_TO_PC_HIGH are input to an AND circuit 611, and signals +TRAP_ADRS[63:32,P7:P4] and +SEL_TRAP_ADRS_TO_PC are input to an AND circuit 612. The signal +SEL_TRAP_ADRS_TO_PC becomes "1" when selecting the signal +TRAP_ADRS upon generation of the trap. An OR circuit 613 outputs a set signal +SET_PC[63:32,P7:P4] for the program counter PC, based on outputs of the AND circuits 611 and 612. Signals +INCR_PC[31:0,P3:P0] and +SEL_INCR_TO_PC_LOW are input to an AND circuit 614, and signals +TRAP_ADRS[31:0,P3:P0] and +SEL_TRAP_ADRS_TO_PC are input to an AND circuit 615. An OR circuit 616 outputs a set signal +SET_PC[31:0,P3:P0] for the program counter PC, based on outputs of the AND circuits 614 and 615.

Therefore, according to this embodiment, the branching destination address register is provided, and the instruction address register is updated at a high speed depending on the number of simultaneously committed instructions. In addition, because the control of the branch instruction can be made independently in the branch instruction controller, the branch predictor, the branching destination address register and the instruction completion controller, it is possible to improve the throughput of the branching and realize a circuit having a minimum assembling area.

In the architecture using the instruction address space having the length of 64 bits, it is possible to control the branch instruction in the branch instruction controller and in the part which generates the branching destination address using only the lower 32 bits, the carry bit (CARRY) and the borrow bit (BORROW).

Further, the present invention is not limited to these embodiments, but various variations and modifications may be made without departing from the scope of the present invention.

What is claimed is:

1. A program counter control method for controlling instructions using a branch prediction mechanism and controlling an architecture having a delay instruction that follows a branch instruction, comprising:
   simultaneously committing a plurality of instructions including the branch instruction and the delay instruction, when a branch prediction is successful and a branch is taken;
   holding values of a program counter and a next program counter from a time when an instruction is committed until a next instruction is committed;
   when the delay instruction is annulled by the branch instruction, treating the delay instruction as a non-operation (NOP) instruction during a program counter update cycle, based upon simultaneous updating of the program counter and the next program counter that replaces the delay instruction by the NOP instruction and setting an address of a branch target instruction into the next program counter which is to be actually executed next to the branch instruction, when the plurality of instructions are committed, the program counter update cycle being a time interval from a time when the values of the program counter and the next program counter are updated when the branch instruction is committed until the values of the program counter and the next program counter are updated when the delay instruction is annulled by the branch instruction;
   setting a signal when annulling the delay instruction; and
   upon an interrupt of an interrupt process when the signal is set, according to the set signal updating once the program counter and the next program counter and updating again the program counter and the next program counter during the interrupt process.

2. The program counter control method as claimed in claim 1, wherein said branch instruction has an annul bit controlling an instruction unit to execute the delay instruction if the branch is not taken and the annul bit indicates the delay instruction is not to be annulled.

3. The program counter control method as claimed in claim 1, wherein if an interrupt occurs before the branch instruction committing, simultaneously updating the next program counter indicating the address of the branch target instruction which is to be actually executed next to the branch instruction.

4. The program counter control method as claimed in claim 1, wherein said architecture uses an instruction address space having a length of 64 bits, further comprising:
   controlling the branch instruction and generating a branching destination address, using only lower 32 bits, a carry bit and a borrow bit of the instruction.

5. A program counter control method for controlling instructions using a branch prediction mechanism and controlling an architecture having a delay instruction that follows a branch instruction, comprising:
   simultaneously committing a plurality of instructions including the branch instruction and the delay instruction, when a branch prediction is successful and a branch is not taken;
   holding values of a program counter and a next program counter from a time when an instruction is committed until a next instruction is committed;
   when the delay instruction is annulled by the branch instruction, treating the delay instruction as a non-operation (NOP) instruction during a program counter update cycle, based upon simultaneous updating of the program counter and the next program counter that replaces the delay instruction by the NOP instruction and setting an address of a branch target instruction into the next program counter which is to be actually executed next to the branch instruction, when the plurality of instructions are committed, the program counter update cycle being a time interval from a time when the values of the program counter and the next program counter are updated when the branch instruction is committed until the values of the program counter and the next program counter are updated when the delay instruction is annulled by the branch instruction;

setting a signal when annulling the delay instruction; and upon an interrupt of an interrupt process when the signal is set, according to the set signal updating once the program counter and the next program counter and updating again the program counter and the next program counter during the interrupt process.

6. The program counter control method as claimed in claim 5, wherein said branch instruction has an annul bit controlling an instruction unit to execute the delay instruction if a branch is not taken and the annul bit indicates the delay instruction is not to be annulled.

7. The program counter control method as claimed in claim 5, wherein if an interrupt occurs before the branch instruction committing, simultaneously updating the next program counter indicating the address of the next instruction to the delay instruction which is to be actually executed next to the branch instruction.

8. The program counter control method as claimed in claim 5, wherein said architecture uses an instruction address space having a length of 64 bits, further comprising:

controlling the branch instruction and generating a branching destination address, using only lower 32 bits, a carry bit and a borrow bit of the instruction.

9. A program counter control method for controlling instructions using a branch prediction mechanism and controlling an architecture having a delay instruction that follows a branch instruction, comprising:

simultaneously committing a plurality of instructions including the branch instruction and the delay instruction, when a branch prediction fails and a branch is taken;

holding values of a program counter and a next program counter from a time when an instruction is committed until a next instruction is committed;

when the delay instruction is annulled by the branch instruction, treating the delay instruction as a non-operation (NOP) instruction during a program counter update cycle, based upon simultaneous updating of the program counter and the next program counter that replaces the delay instruction by the NOP instruction and setting an address of a branch target instruction into the next program counter which is to be actually executed next to the branch instruction, when the plurality of instructions are committed, the program counter update cycle being a time interval from a time when the values of the program counter and the next program counter are updated when the branch instruction is committed until the values of the program counter and the next program counter are updated when the delay instruction is annulled by the branch instruction;

setting a signal when annulling the delay instruction; and upon an interrupt of an interrupt process when the signal is set, according to the set signal updating once the program counter and the next program counter and updating again the program counter and the next program counter during the interrupt process.

10. The program counter control method as claimed in claim 9, wherein said branch instruction has an annul bit controlling an instruction unit to execute the delay instruction if a branch is not taken and the annul bit indicates the delay instruction is not to be annulled.

11. The program counter control method as claimed in claim 9, wherein if an interrupt occurs before the branch instruction committing, simultaneously updating the next program counter indicating the address of the branch target instruction which is to be actually executed next to the branch instruction.

12. The program counter control method as claimed in claim 9, wherein said architecture uses an instruction address space having a length of 64 bits, further comprising:

controlling the branch instruction and generating a branching destination address, using only lower 32 bits, a carry bit and a borrow bit of the instruction.

13. A program counter control method for controlling instructions using a branch prediction mechanism and controlling an architecture having a delay instruction that follows a branch instruction, comprising:

simultaneously committing a plurality of instructions including the branch instruction and the delay instruction, when a branch prediction fails and a branch is not taken;

holding values of a program counter and a next program counter from a time when an instruction is committed until a next instruction is committed;

when the delay instruction is annulled by the branch instruction, treating the delay instruction as a non-operation (NOP) instruction during a program counter update cycle, based upon simultaneous updating of the program counter and the next program counter that replaces the delay instruction by the NOP instruction and setting an address of a branch target instruction into the next program counter which is to be actually executed next to the branch instruction, when the plurality of instructions are committed, the program counter update cycle being a time interval from a time when the values of the program counter and the next program counter are updated when the branch instruction is committed until the values of the program counter and the next program counter are updated when the delay instruction is annulled by the branch instruction;

setting a signal when annulling the delay instruction; and upon an interrupt of an interrupt process when the signal is set, according to the set signal updating once the program counter and the next program counter and updating again the program counter and the next program counter during the interrupt process.

14. The program counter control method as claimed in claim 13, wherein said branch instruction has an annul bit controlling an instruction unit to execute the delay instruction if a branch is not taken and the annul bit indicates the delay instruction is not to be annulled.

15. The program counter control method as claimed in claim 13, wherein if an interrupt occurs before the branch instruction committing, simultaneously updating the next program counter indicating the address of the next instruction to the annulled delay instruction which is to be actually executed next to the branch instruction.

16. The program counter control method as claimed in claim 13, wherein said architecture uses an instruction address space having a length of 64 bits, further comprising:

controlling the branch instruction and generating a branching destination address, using only lower 32 bits, a carry bit and a borrow bit of the instruction.

17. A processor which controls instructions using a branch predictor and controls an architecture having a delay instruction that follows a branch instruction for branching, comprising:
an instruction controller
holding values of a program counter and a next program counter from a time when an instruction is committed until a next instruction is committed,
when the delay instruction is annulled by the branch instruction, treating the delay instruction as a non-operation (NOP) instruction during a program counter update cycle, based upon simultaneous updating of the program counter and the next program counter that replaces the delay instruction by the NOP instruction and setting an address of a branch target instruction into the next program counter which is to be actually executed next to the branch instruction, the program counter update cycle being a time interval from a time when the values of the program counter and the next program counter are updated when the branch instruction is committed until the values of the program counter and the next program counter are updated when the delay instruction is annulled by the branch instruction,
setting a signal when annulling the delay instruction, and
upon an interrupt of an interrupt process when the signal is set, according to the set signal updating once the program counter and the next program counter and updating again the program counter and the next program counter during the interrupt process;
a branch predictor predicting the branch instruction;
a branch instruction controller
simultaneously controlling a plurality of branch instructions by judging branch conditions of the branch instructions having an annul bit,
controlling the instruction controller to treat the delay instruction as the NOP instruction, if the annul bit indicates the delay instruction is to be annulled, and
determining whether a branch prediction by the branch predictor is successful and controlling an instruction refetch according to the branch prediction; and
a branching destination address register storing a plurality of branching destination addresses of branch instructions branching of which is definite,
wherein said branching destination address register, said branch instruction controller and said branch predictor are provided independent of the instruction controller and independently control the branch instructions.

18. The processor as claimed in claim 17, wherein said architecture uses an instruction address space having a length of 64 bits, further comprising:
an instruction controller controlling the branch instructions and generating the branching destination addresses, using only lower 32 bits, a carry bit and a borrow bit of the instructions.

19. A processor which controls instructions using a branch predictor and controls an architecture having a delay instruction that follows a branch instruction for branching, comprising:
an instruction decoder treating the delay instruction of the branch instruction as a non-operation (NOP) instruction, when the delay instruction is annulled by the branch instruction;
an instruction completion controller simultaneously committing a plurality of instructions including the branch instruction and the delay instruction, when a branch prediction is successful and a branch is taken;
a program counter section having a program counter indicating an address of the delay instruction when the delay instruction is annulled, and a next program counter indicating an address of a next instruction following the executed branch instruction, wherein values of the program counter and the next program counter are held from a time when an instruction is committed until a next instruction is committed; and
a branch destination address register adapted for simultaneously updating the program counter and the next program counter when the plurality of instructions are committed, and treating the delay instruction as the NOP instruction during a program counter update cycle, based upon simultaneous updating of the program counter and the next program counter that replaces the delay instruction by the NOP instruction and setting an address of a branch target instruction into the next program counter which is to be actually executed next to the branch instruction, and adapted for setting a signal when annulling the delay instruction,
wherein the program counter update cycle is a time interval from a time when the values of the program counter and the next program counter are updated when the branch instruction is committed until the values of the program counter and the next program counter are updated when the delay instruction is annulled by the branch instruction, and
wherein upon an interrupt of an interrupt process when the signal is set, according to the set signal updating once the program counter and the next program counter and updating again the program counter and the next program counter during the interrupt process.

20. The processor as claimed in claim 19, wherein said architecture uses an instruction address space having a length of 64 bits, further comprising:
an instruction controller controlling the branch instruction and generating a branching destination address, using only lower 32 bits, a carry bit and a borrow bit of the instruction.

21. A processor which controls instructions using a branch predictor and controls an architecture having a delay instruction that follows a branch instruction for branching, comprising:
an instruction decoder treating the delay instruction of the branch instruction as a non-operation (NOP) instruction, when the delay instruction is annulled by the branch instruction;
an instruction completion controller simultaneously committing a plurality of instructions including the branch instruction and the delay instruction, when a branch prediction is successful and a branch is not taken;
a program counter section having a program counter indicating an address of the delay instruction when the delay instruction is annulled, and a next program counter indicating an address of an instruction following to the annulled delay instruction, wherein values of the program counter and the next program counter are held from a time when an instruction is committed until a next instruction is committed; and
a branch destination address register adapted for simultaneously updating the program counter and the next program counter when the plurality of instructions are committed, and treating the delay instruction as the NOP instruction during a program counter update cycle, based upon simultaneous updating of the program counter and the next program counter that replaces the delay instruction by the NOP instruction and setting an address of a branch target instruction into the next program counter which is to be actually executed next to the branch instruction, and adapted for setting a signal when annulling the delay instruction, wherein the program counter update cycle is a time interval from a time when the values of the program counter and the next program counter are updated when the branch instruction is committed until the values of the program counter and the next program counter are updated when the delay instruction is annulled by the branch instruction, and wherein upon an interrupt of an interrupt process when the signal is set, according to the set signal updating once the program counter and the next program counter and updating again the program counter and the next program counter during the interrupt process.

22. The processor as claimed in claim 21, wherein said architecture uses an instruction address space having a length of 64 bits, further comprising:

an instruction controller controlling the branch instruction and generating a branching destination address, using only lower 32 bits, a carry bit and a borrow bit of the instruction.

23. A processor which controls instructions using a branch predictor and controls an architecture having a delay instruction that follows a branch instruction for branching, comprising:

an instruction decoder treating the delay instruction of the branch instruction as a non-operation (NOP) instruction, when the delay instruction is annulled by a branch instruction;

an instruction completion controller simultaneously committing a plurality of instructions including the branch instruction and the delay instruction, when a branch prediction fails and a branch is taken;

a program counter section having a program counter indicating an address of the delay instruction when the delay instruction is annulled, and a next program counter indicating an address of a next instruction following the executed branch instruction, wherein values of the program counter and the next program counter are held from a time when an instruction is committed until a next instruction is committed; and a branch destination address register adapted for simultaneously updating the program counter and the next program counter when the plurality of instructions are committed, and treating the delay instruction as the NOP instruction during a program counter update cycle, based upon simultaneous updating of the program counter and the next program counter that replaces the delay instruction by the NOP instruction and setting an address of a branch target instruction into the next program counter which is to be actually executed next to the branch instruction, and adapted for setting a signal when annulling the delay instruction, wherein the program counter update cycle is a time interval from a time when the values of the program counter and the next program counter are updated when the branch instruction is committed until the values of the program counter and the next program counter are updated when the delay instruction is annulled by the branch instruction, and wherein upon an interrupt of an interrupt process when the signal is set, according to the set signal updating once the program counter and the next program counter and updating again the program counter and the next program counter during the interrupt process.

24. The processor as claimed in claim 23, wherein said architecture uses an instruction address space having a length of 64 bits, further comprising:

an instruction controller controlling the branch instruction and generating a branching destination address, using only lower 32 bits, a carry bit and a borrow bit of the instruction.

25. A processor which controls instructions using a branch predictor and controls an architecture having a delay instruction that follows a branch instruction for branching, comprising:

an instruction decoder treating the delay instruction of the branch instruction as a non-operation (NOP) instruction, when the delay instruction is annulled by a branch instruction;

an instruction completion controller simultaneously committing a plurality of instructions including the branch instruction and the delay instruction, when a branch prediction fails and a branch is not taken;

a program counter section having a program counter indicating an address of the delay instruction when the delay instruction is annulled, and a next program counter indicating a next address of an instruction following the annulled delay instruction, wherein values of the program counter and the next program counter are held from a time when an instruction is committed until a next instruction is committed; and a branch destination address register adapted for simultaneously updating the program counter and the next program counter when the plurality of instructions are committed, and treating the delay instruction as the non-operation instruction during a program counter update cycle, based upon simultaneous updating of the program counter and the next program counter that replaces the delay instruction by the NOP instruction and setting an address of a branch target instruction into the next program counter which is to be actually executed next to the branch instruction, and adapted for setting a signal when annulling the delay instruction, wherein the program counter update cycle is a time interval from a time when the values of the program counter and the next program counter are updated when the branch instruction is committed until the values of the program counter and the next program counter are updated when the delay instruction is annulled by the branch instruction, and wherein upon an interrupt of an interrupt process when the signal is set, according to the set signal updating once the program counter and the next program counter and updating again the program counter and the next program counter during the interrupt process.

26. The processor as claimed in claim 25, wherein said architecture uses an instruction address space having a length of 64 bits, further comprising:

an instruction controller controlling the branch instruction and generating a branching destination address, using only lower 32 bits, a carry bit and a borrow bit of the instruction.

27. The processor as claimed in claim 17, wherein the instruction controller comprises an instruction completion controller simultaneously committing a plurality of instructions, including the branch instruction, when the branch prediction by the branch predictor is successful and the branch instruction branches, and wherein the branching destination address register simultaneously updates the program counter and the next program counter depending on a number of simultaneously committed instructions.

28. A program counter control method for controlling instructions using a branch prediction mechanism and controlling an architecture having a delay instruction that follows a branch instruction, comprising:
   simultaneously committing a plurality of instructions including the branch instruction and the delay instruction, according to the branch prediction;
   holding values of a program counter and a next program counter from a time when an instruction is committed until a next instruction is committed; and
   when the delay instruction is annulled by the branch instruction, treating the delay instruction as a non-operation (NOP) instruction during program counter update cycle, based upon simultaneous updating of the program counter and the next program counter that replaces the delay instruction by the NOP instruction and setting an address of a branch target instruction into the next program counter which is to be actually executed next to the branch instruction, when the plurality of instructions are committed, the program counter update cycle being a time interval from a time when the values of the program counter and the next program counter are updated when the branch instruction is committed until the values of the program counter and the next program counter are updated when the delay instruction is annulled by the branch instruction;
   setting a signal when annulling the delay instruction; and
   upon an interrupt of an interrupt process when the signal is set, according to the set signal updating once the program counter and the next program counter and updating again the program counter and the next program counter during the interrupt process.

* * * * *